(12) United States Patent
Lee et al.

(10) Patent No.: US 7,823,434 B2
(45) Date of Patent: Nov. 2, 2010

(54) LIVE TOOLING SYSTEMS FOR MACHINE TOOLS

(75) Inventors: Brian J. Lee, Elk River, MN (US); Jon M. Shimota, Stillwater, MN (US)

(73) Assignee: Wilson Tool International Inc., White Bear Lake, MN (US)

( * ) Notice: Subject to any disclaimer, the term of this patent is extended or adjusted under 35 U.S.C. 154(b) by 392 days.

(21) Appl. No.: 11/963,914

(22) Filed: Dec. 24, 2007

(65) Prior Publication Data

US 2009/0007747 A1  Jan. 8, 2009

Related U.S. Application Data

(60) Provisional application No. 60/914,468, filed on Apr. 27, 2007.

(51) Int. Cl.
*B21D 28/20* (2006.01)
*B21D 28/36* (2006.01)
*B26F 1/04* (2006.01)

(52) U.S. Cl. .......... 72/442; 72/437; 72/453.13; 72/472; 60/414; 60/431; 83/552; 83/563; 29/33 J; 29/36

(58) Field of Classification Search .......... 72/351, 72/442, 446, 447, 448, 453.13, 472; 60/414, 60/431, 432, 477; 83/552, 563; 29/33 J, 29/36
See application file for complete search history.

(56) References Cited

U.S. PATENT DOCUMENTS 3,667,048 A * 5/1972 Hansen .......... 375/357
5,299,444 A * 4/1994 Kirii et al. .......... 72/453.13
5,862,663 A   1/1999 Lanza et al.
6,085,520 A * 7/2000 Kohno .......... 60/414
6,237,390 B1  5/2001 Honsel et al.
6,945,039 B2  9/2005 Yoshino
2003/0102844 A1  6/2003 Bailey
2006/0250029 A1  11/2006 Kelly et al.
2009/0071218 A1*  3/2009 Kohno et al. .......... 72/351

FOREIGN PATENT DOCUMENTS

| DE | 103 25 719 A | 1/2005 |
| EP | 0 394 925 B1 | 10/1990 |
| GB | 2 319 670 A | 5/1998 |
| WO | 2006/123452 A | 11/2006 |

OTHER PUBLICATIONS

PCT Application No. PCT/US2008/061743, International Search Report and Written Opinion dated Jul. 9, 2008, 10 pages.

* cited by examiner

*Primary Examiner*—David B Jones
(74) *Attorney, Agent, or Firm*—Fredrikson & Byron, P.A.

(57) ABSTRACT

In conventional ram-driven presses, the downward stroke of the ram into a tool causes acceleration of the tool, thereby facilitating an operation on a workpiece by the tip of the tool. While the ram stroke is found to impart sufficient dynamic energy to the tool to facilitate the necessitated operation by the tool tip, there are other more efficient, and in turn, more effective, means and methods of actuating the tool tip, with such means and methods being facilitated from energy derived from the tool's acceleration or from energy from other external sources.

52 Claims, 19 Drawing Sheets

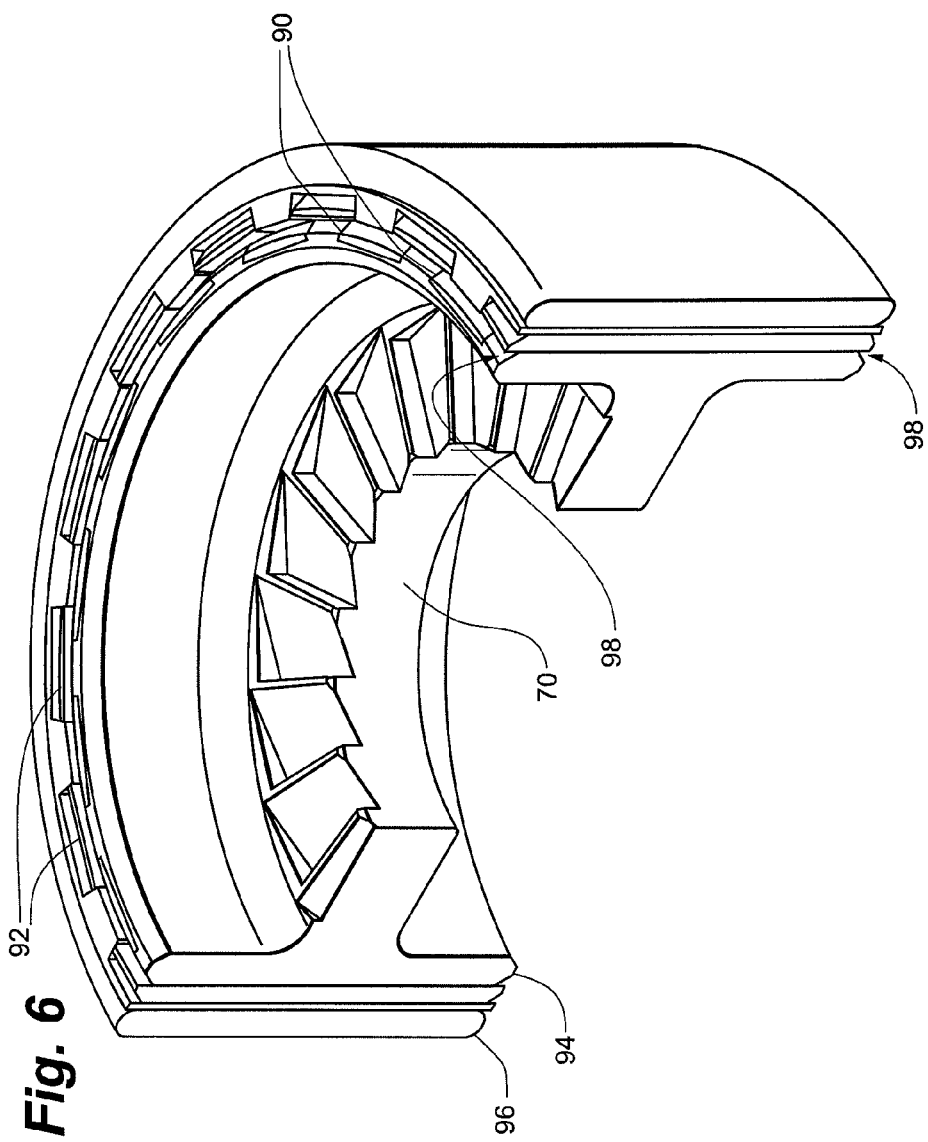
*Fig. 6*
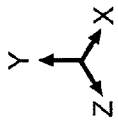

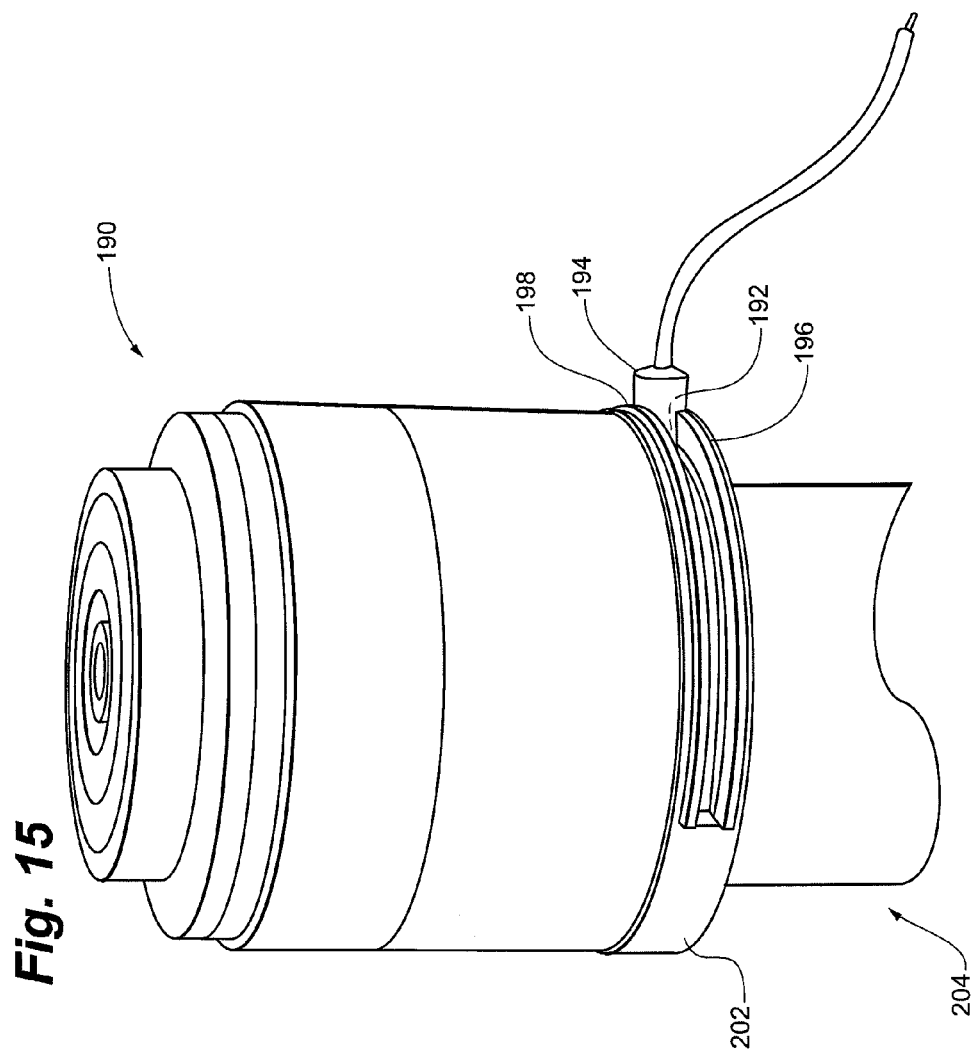

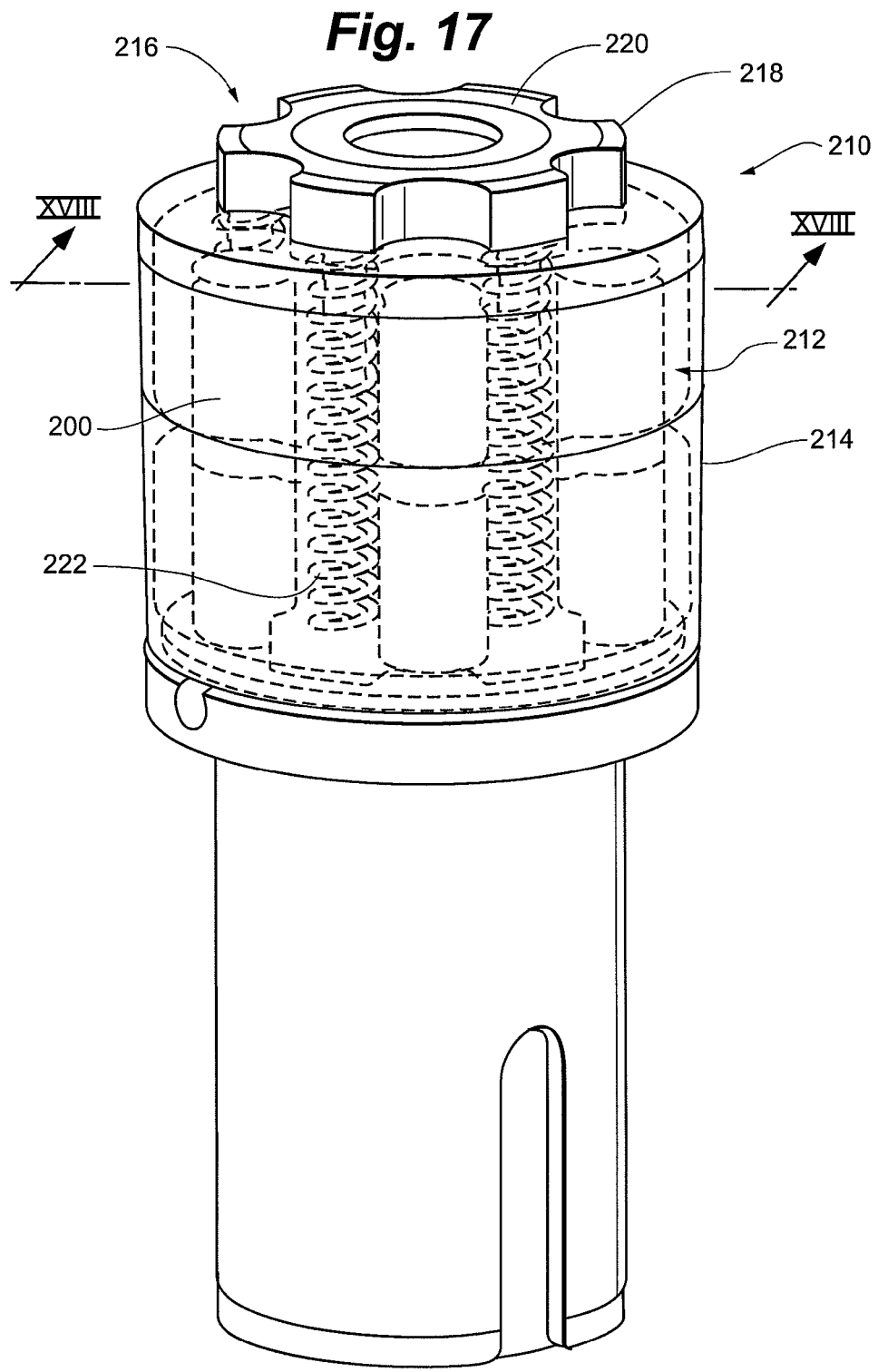

LIVE TOOLING SYSTEMS FOR MACHINE TOOLS

CROSS REFERENCE TO RELATED APPLICATIONS

The present application claims priority to U.S. provisional application No. 60/914,468, filed Apr. 27, 2007, the disclosure of which is incorporated herein by reference.

FIELD OF THE INVENTION

The present invention relates generally to assemblies and methods for tooling systems used with industrial presses. In particular, this invention relates to assemblies and methods employed by metal-fabricating presses.

BACKGROUND OF THE INVENTION

Ram-driven presses, e.g., punch presses, are well known in the art. Punch presses are typically configured to hold a plurality of tools for forming a variety of shapes and sizes of indentations and/or holes in sheet workpieces, e.g., sheet metal. Tools of this sort commonly include a punch and die. When a punch and corresponding die are mounted in a press and located in a working position of the press, e.g., beneath the ram (in some cases, coupled directly to the ram), the punch is driven, according to a pre-programmed ram stroke, to form an indentation or a hole through a sheet workpiece which has been located between the punch and die.

Such punch presses may be turret presses, single-station presses, or other metal fabricating presses. Turret presses, for example, commonly employ a rotatable upper table or "turret" that carries a plurality of tools (e.g., punches), and a rotatable lower table/turret that carries a plurality of dies. In contrast, single station punch presses generally do not have turrets, but rather have a single station adapted for pressing workpieces.

Regarding turret presses, when the upper and lower tables are rotated into a position where a particular male punch on the upper table is aligned with a particular female die on the lower table, a workpiece (e.g., a piece of sheet metal) between the two tables can be machined (punched, bent, etc.) by moving the punch downwardly into contact with the workpiece so that the punch deforms (or pierces) the workpiece. The downward movement of the punch is caused when a ram strikes an upper part (head or punch driver) of the punch.

As described above, with a conventional turret tool, when the ram of the turret press strikes the punch driver, a lower tip of the punch is driven forcefully downwardly into contact with a workpiece, which is then deformed (e.g., punched, bent, etc.) between the punch tip and the die. Thus, when the ram strikes the top of the tool (which is rigidly coupled to the tip of the tool), the tip of the tool is caused to move forcefully downwardly against the workpiece.

The die commonly has a recess into which the tip of the punch projects during the punching operation. In some cases, a hole is punched in the workpiece during the downstroke of the punch, from which the tip of the punch may shear through the sheet metal (in the process, the tip of the punch extends into the die's central recess). However, as is known, the punching operation can involve other machining or inspecting of the workpiece during the downstroke of the punch, such as bending, tapping, measuring, etc. of the workpiece.

Thus, in conventional ram-driven presses, the downward stroke of the ram into a tool causes acceleration of the tool. This acceleration of the tool facilitates an operation on a workpiece by the tip of the tool. While the ram stroke is found to impart sufficient dynamic energy to the tool to facilitate the necessitated operation by the tool tip, there are other more efficient, and in turn, more effective, means and methods of actuating the tool tip, with such means and methods being facilitated from energy derived from the tool's acceleration or from energy from other external sources.

SUMMARY

In one group of embodiments, the invention provides a tool adapted for use on a metal-fabricating press having a ram configured to strike and accelerate the tool. The tool has a generator adapted to transform dynamic energy from a stroke of the ram into electrical energy.

Optionally, the dynamic energy comprises kinetic mechanical energy. In addition, the generator may optionally comprise a magnet and a coil. Additionally, the tool may optionally have an axis and a shaft of the tool may move along the axis during said acceleration of the tool, and wherein in response to axial movement of the shaft, the magnet may undergo a relative rotation with respect to the coil about the axis, thereby creating the electrical energy. The magnet may optionally be part of a series of magnets that may undergo rotary motion in response to said acceleration of the tool. In addition, the magnets may optionally be disposed on a flywheel incorporated into the tool. Optionally, the tool may include a flywheel that may undergo rotary motion in response to axial movement of a shaft of the tool. In addition, the tool may optionally have a head driven by the ram to initiate said acceleration of the tool, where the tool may have a housing in which the flywheel is located, where the tool may have a spring located between the head and the housing, and where the spring may encompass the shaft. Optionally, the axial movement of the shaft may cause a driven body, which may be coupled with the shaft, to rotate, where the driven body may be coupled with the flywheel such that said rotation of the driven body may mechanically urge the flywheel into rotary motion. Additionally, the driven body may be optionally coupled with the flywheel by virtue of at least one pawl adapted to transfer force from the driven body to the flywheel so as to set the flywheel in motion. Optionally, the magnet may move linearly in response to said acceleration of the tool.

Optionally, a motor can be incorporated into the tool, with the motor electrically coupled with the generator such that electrical energy created by the generator may be used to power the motor.

Optionally, the tool can include a reserve adapted to store electrical energy created by the generator. In addition, the reserve may optionally be adapted to deliver electric current so as to energize a component of the tool, thereby causing the tool to act on a workpiece. Additionally, the tool may be optionally configured such that said act is selected from the group consisting of punching the workpiece, bending the workpiece, creating a form in the workpiece, rotary cutting of the workpiece, deburring the workpiece, tapping the workpiece, ink printing on the workpiece, spotwelding the workpiece, forming a swirl pattern on the workpiece, measuring the workpiece, and inspecting the workpiece. Optionally, the reserve may comprise a rechargeable battery carried on the tool.

Optionally, the generator may be electrically coupled to a reserve remote from the tool, wherein electrical energy created by the generator is stored by the reserve, with the reserve being adapted to deliver electric current so as to energize a component of the tool, thereby causing the tool to act on a workpiece.

Optionally, the acceleration of the tool may involve movement of at least one component of the tool. In addition, the moveable component may optionally comprise a head of the tool. Alternatively, the moveable component may optionally comprise a shaft that moves axially during said acceleration of the tool.

In another group of embodiments, the invention provides a tool and a metal-fabricating press in combination. The tool is operably mounted on the press. The press has a ram configured to accelerate the tool. The tool has a generator adapted to transform dynamic energy, created when the ram accelerates the tool, into electrical energy.

Optionally, the dynamic energy comprises kinetic mechanical energy. In addition, the generator may optionally comprise a magnet and coil. Additionally, the tool may optionally have an axis, and a shaft of the tool may move along the axis during said acceleration of the tool, and wherein in response to said axial movement of the shaft the magnet may undergo a relative rotation with respect to the coil about the axis, thereby creating the electrical energy. Optionally, the tool may include a flywheel that may undergo rotary motion in response to axial movement of a shaft of the tool. In addition, the tool may optionally have a head that can be driven by the ram to initiate said acceleration of the tool, where the tool may have a housing in which the flywheel is located, the tool may have a spring located between the head and the housing, and the spring may encompass the shaft. Optionally, said axial movement of the shaft may cause a driven body, which is coupled with the shaft, to rotate, where the driven body may be coupled with the flywheel such that said rotation of the driven body mechanically urges the flywheel into rotary motion.

Optionally, the press may have a table with multiple stations each including a mount opening passing through the table, wherein the ram and the table can optionally be adapted for relative movement such that the ram can be selectively aligned with different stations of the table. In addition, the press may be a turret press, where said table may be an upper turret table, the turret press may include a lower turret table, and the upper and lower turret tables may be rotatable about a vertical axis.

Optionally, a motor can be incorporated into the tool, where the motor may be electrically coupled with the generator such that electrical energy created by the generator may be used to power the motor Optionally, the tool can include a reserve adapted to store electrical energy created by the generator. In addition, the reserve may optionally be adapted to deliver electric current so as to energize a component of the tool, thereby causing the tool to act on a workpiece. Optionally, the reserve may comprise a rechargeable battery carried on the tool.

In another group of embodiments, the invention provides a method of using a press. The method involves a tool and a metal-fabricating press in combination. The tool is operably mounted on the press. The press has a ram configured to strike and accelerate the tool. The tool has a generator adapted to transform dynamic energy, created when the ram accelerates the tool, into electrical energy. The present method comprises actuating the ram of the press to accelerate the tool thereby causing the generator to transform said dynamic energy into electrical energy.

Optionally, the dynamic energy can comprise kinetic mechanical energy and the generator can transform the kinetic mechanical energy into said electrical energy. In addition, the generator may optionally comprise a magnet and a coil, where the tool may have an axis, and a shaft of the tool may move along the axis during said acceleration of the tool, and wherein in response to said axial movement of the shaft the magnet may undergo a relative rotation with respect to the coil about the axis, thereby creating the electrical energy. Optionally, the tool may have a flywheel that may undergo rotary motion in response to axial movement of a shaft of the tool. In addition, said axial movement of the shaft may optionally cause a driven body of the tool to rotate, where the driven body may be coupled with the flywheel such that said rotation of the driven body may mechanically urge the flywheel into rotary motion. Additionally, at least one pawl may optionally transfer force from the driven body to the flywheel and thereby may mechanically set the flywheel in motion.

Optionally, the tool can include a reserve, and the method may comprise storing in the reserve electrical energy created by the generator. In addition, the method may optionally comprise delivering electric current from the reserve to energize a component of the tool, thereby causing the tool to act on a workpiece. Additionally, the act may optionally be selected from the group consisting of punching the workpiece, bending the workpiece, creating a form in the workpiece, rotary cutting of the workpiece, deburring the workpiece, tapping the workpiece, ink printing on the workpiece, spotwelding the workpiece, forming a swirl pattern on the workpiece, measuring the workpiece, and inspecting the workpiece.

Optionally, a motor can be incorporated into the tool and can be electrically coupled with the generator, where the method can comprise powering the motor with electrical energy created by the generator.

In a further group of embodiments, the invention provides a tool adapted for use on a metal-fabricating press. The tool has a power source. The power source is adapted to deliver electric current so as to energize a component of the tool, thereby causing the tool to act on a workpiece.

Optionally, the power source can comprise a reserve, and the tool may be adapted to provide a dual-charging capability characterized by the reserve being chargeable by either of two charging methods, where a first of the charging methods may involve use of a generator incorporated into the tool, where the generator may be adapted to transform dynamic energy, created when a ram of the press accelerates the tool, into electrical energy, with the electrical energy being provided to the reserve, and a second of the charging methods optionally involving an external source of AC or DC power being optionally connected to a power port on the tool so as to optionally deliver electric current from the external source to the reserve. In addition, the dynamic energy may comprise kinetic mechanical energy.

Optionally, said component can comprise a motor that is incorporated into the tool, the motor optionally being electrically coupled with the power source such electric current from the power source may be used to power the motor.

Optionally, the tool can be configured such that said act may be selected from the group consisting of punching the workpiece, bending the workpiece, creating a form in the workpiece, rotary cutting of the workpiece, deburring the workpiece, tapping the workpiece, ink printing on the workpiece, spotwelding the workpiece, forming a swirl pattern on the workpiece, measuring the workpiece, and inspecting the workpiece Optionally, the tool can include a generator adapted to transform dynamic energy, created when a ram accelerates the tool, into electrical energy. In addition, the dynamic energy may optionally comprise kinetic mechanical energy.

Optionally, the power source can be adapted to deliver electric current so as to energize a laser marking head of the tool.

Optionally, the power source can be adapted to deliver electric current so as to energize a laser cutting head of the tool.

Optionally, the power source can be an internal power source incorporated into the tool.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 6 is a cross-sectional perspective view of the generator of FIG. 5, along the lines VI-VI.

FIG. 15 is a perspective view of the tool assembly with a rotatable socket/plug configuration in accordance with certain embodiments of the invention.

FIG. 17 is a perspective view of a tool assembly with a reserve located thereon in accordance with certain embodiments of the invention.

DETAILED DESCRIPTION OF PREFERRED EMBODIMENTS

Figure 1:
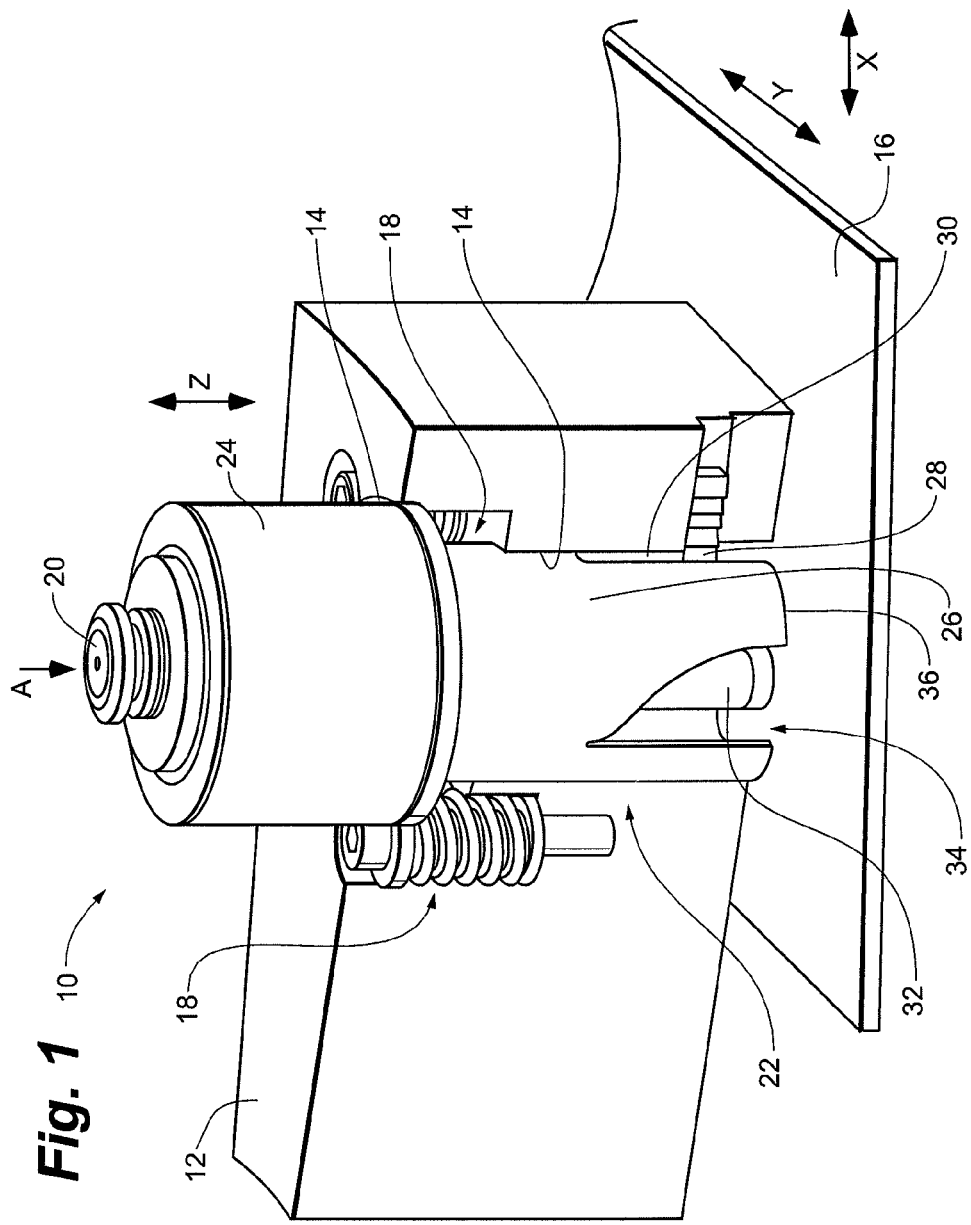
FIG. 1 is a perspective view of a tool assembly assembled into a portion of a ram-driven press in accordance with certain embodiments of the invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the given examples have many useful alternatives, which fall within the scope of the invention. In particular, it should be noted that, although a majority of embodiments of the present invention are shown and described in the context of a turret-style punch press, the invention is not so limited and alternative embodiments may be employed in any other style or type of press, for example, including single station punch presses.

FIG. 1 is a perspective view of a tool assembly 10, according to certain embodiments of the present invention, assembled to be used in a portion of a press. As described above, the press is used for fabricating metal. FIG. 1 shows a segment of a mounting assembly, or an upper turret 12, cut away along a mount opening or bore 14 thereof, in order to illustrate a mounting of the tool assembly 10 therein for performing an operation on a workpiece 16, exemplarily shown as a sheet. As illustrated, the tool assembly 10 extends through the bore 14 and rests on lifter springs 18 mounted within and about a periphery of the bore 14.

Those skilled in the art will understand that, although not shown, an entirety of the upper turret 12 includes a plurality of additional mount openings or bores, either larger or smaller or similar in diameter to the bore 14, with the additional bores being arranged about a central axis of the upper turret 12. Each of the additional bores would represent a different station along the upper turret 12, such that the upper turret 12 involves a table with multiple stations. Those skilled in the art will further appreciate that, although not shown, the press, which includes the upper turret 12, further includes, among other components, a table that supports the workpiece 16 and moves the workpiece 16 in an X- and Y-direction, a lower turret that resides below the upper turret 12, and a ram or striker. As should be further appreciated, the tables of each of the upper turret 12 and lower turret are rotatable about a vertical axis. Each of the additional bores (not shown), along with the bore 14 of the upper turret 12 typically accommodates a punch portion of a tool assembly, and the lower turret (not shown) typically accommodates the corresponding die portion of the tool assembly, so that, when any of the bores are located beneath the ram of the press, the ram may be struck to drive the punch against a workpiece positioned between the punch and die to form an indentation or a hole therein.

FIG. 1 further illustrates the tool assembly 10 including a striking surface 20 to receive a ram-stroke A of the press, in a Z-direction, and a housing 22 including a first portion 24, resting on the lifter springs 18, and a second portion 26, extending from the first portion 24 through the bore 14. As should be appreciated, the striking surface 20 can be either adjustable or non-adjustable. Those skilled in the art will also appreciate that the tool assembly 10 has been 'dropped', or loaded into the bore 14, having been oriented therein by a key 28 of the upper turret 12 interfacing with a mating slot 30 formed in the second portion 26 of the housing 22. Those skilled in the art will understand that, while not shown, the ram and upper turret 12 are adapted for relative movement such that the ram can be selectively aligned with different stations of the upper turret 12. Although the housing 22 is shown having a cylindrical form in FIG. 1, it should be noted that the invention should not be limited to such, and any suitable geometry for the housing 22 may be employed for embodiments of the present invention. FIG. 1 further illustrates, via a cut-away portion of the housing second portion 26, a functional head 32 of a tool, which is contained within the second portion 26, and oriented to perform a function on workpiece 16 through an opening 34 formed in a bottom surface 36 of the second portion 26.

As described above, the tool used in a ram-driven press is conventionally used in a passive manner. As such, the tip of the tool—the functional head or punch tip—performs an operation on a workpiece in direct response to a ram stroke of the press. The tool assembly 10 of FIG. 1 includes a tool tip 32 that also performs an operation on a workpiece in a passive manner; however, the tool tip 32, in certain embodiments, performs such operation apart from passively responding to a ram stroke of the press. Instead, the tool tip 32 receives its response cue from mechanisms other than the ram, where such mechanisms can be mounted on, or located remote from, the tool assembly 10. As further described below, such a tooling system for ram-driven presses can be more efficient, and thus, more effective, than conventional tooling systems using tool tips which passively respond to the downward stroke of a ram.

For example, as should be appreciated, while a ram stroke can be adapted to impart sufficient dynamic energy to a press tool to facilitate the necessitated processing of a workpiece (via the tool tip), energy is often lost in the transfer. This loss of energy is found to occur because the energy derived from the ram stroke (i.e., resulting in the tool's acceleration) is generally found to exceed that which is needed (and used) by the tool tip for its corresponding operation. Because it is not sufficiently harnessed, such excess energy is generally lost. In certain embodiments of the invention, as described below, various means and methods are provided to derive energy from the acceleration of the tool (resulting from the ram stroke) and transform the derived energy into electrical energy. The electrical energy, in certain embodiments, as further described below, can be used in energizing a component of the tool (e.g., resulting in actuation of one or more tool tips), or can be stored in a reserve for energizing the tool component in the future. Transforming the derived energy into electrical energy allows one to more effectively harvest the energy stemming from the tool's acceleration. In turn, the energy can be used more efficiently with respect to actuating the tool tip.

For example, one could selectively determine when and/or how much electrical energy is to be used in operations of the tool tips of the press. As described above, tool tips of conventional ram-driven presses respond passively following acceleration of the press tool (resulting from the ram striking the tool). Thus, actuation of the tool tip is dependent on the ram stroke rate and corresponding tool acceleration. In contrast, when electrical energy is transformed from energy derived from the tool's acceleration, the tool tip can, in turn, be actuated at any desired rate. With respect to how much electrical energy is used, in most cases, the tools of ram-driven presses are used for fabricating purposes, e.g., used for providing an impression or a hole in the workpiece. However, as described above, other press tools may be used for purposes relating to inspection, assembling, or marking of the workpiece. Quite often, different amounts of energy are required for these different tool operations. Thus, if the energy from a ram stroke was harnessed and stored, it could be regulated accordingly based on a specific tool's operation with respect to the workpiece, thereby maximizing use of the energy created from a ram stroke.

Figure 2:
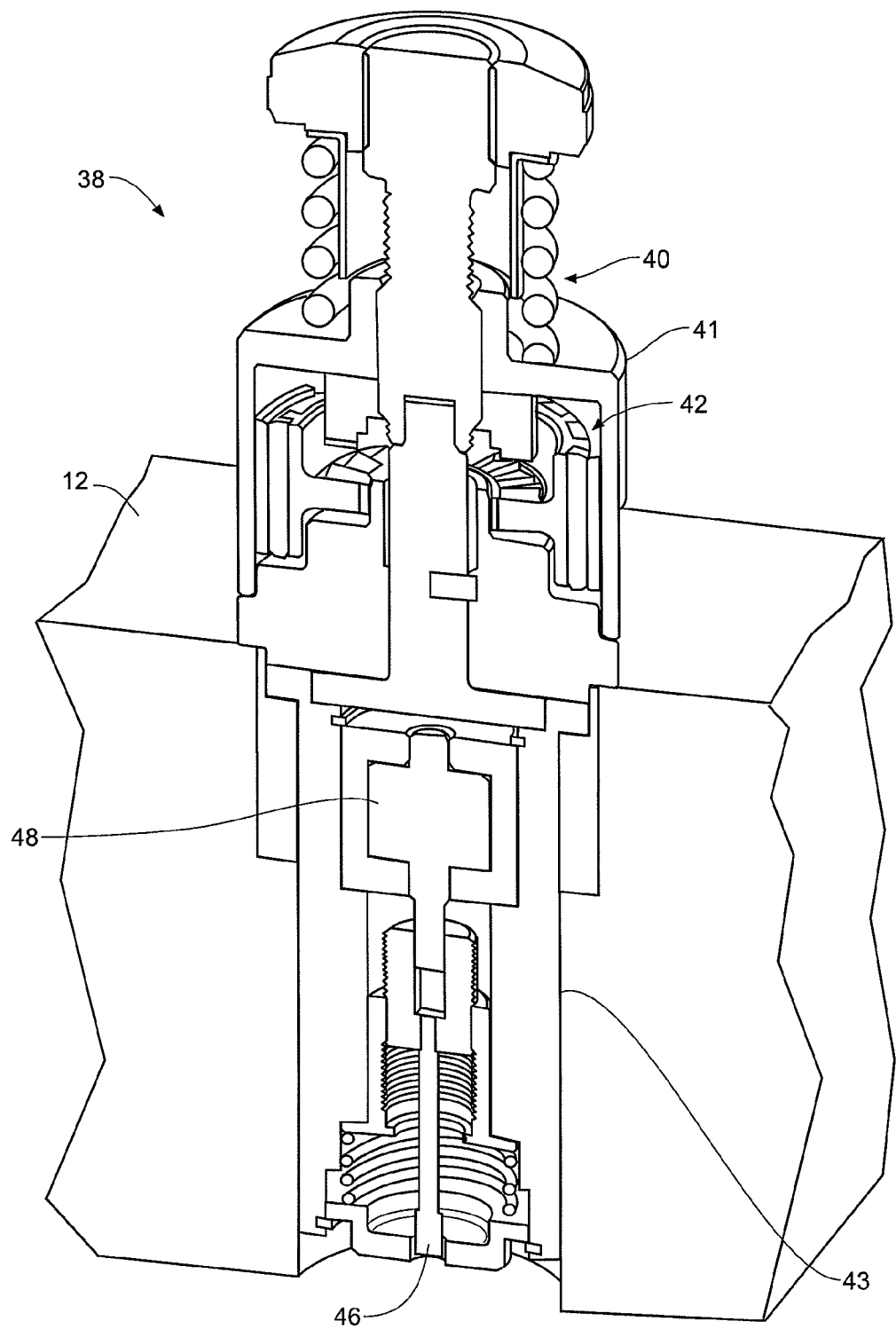
FIG. 2 is a cross-sectional perspective view of a tool assembly in accordance with certain embodiments of the invention, which is assembled in the ram driven press of FIG. 1 in accordance with certain embodiments of the invention.

FIG. 2 is a cross-sectional view of a tool assembly 38 in accordance with certain embodiments of the invention, which is assembled in the ram-driven press of FIG. 1 in accordance with certain embodiments of the invention. As described above, in conventional ram-driven presses, the downward stroke of the ram is used to accelerate the tool of the press. In turn, the tool's acceleration generally facilitates an operation on a workpiece by the tip of the tool. In certain embodiments of the invention, the downward stroke of the ram is used to accelerate a tool (such as tool 40 of FIG. 2); however, as described below, the tool assembly (such as the tool assembly 38) can be adapted to transform dynamic energy derived from such acceleration of the tool into electrical energy. As described below, in certain embodiments, the dynamic energy can include kinetic mechanical energy.

Figure 7:
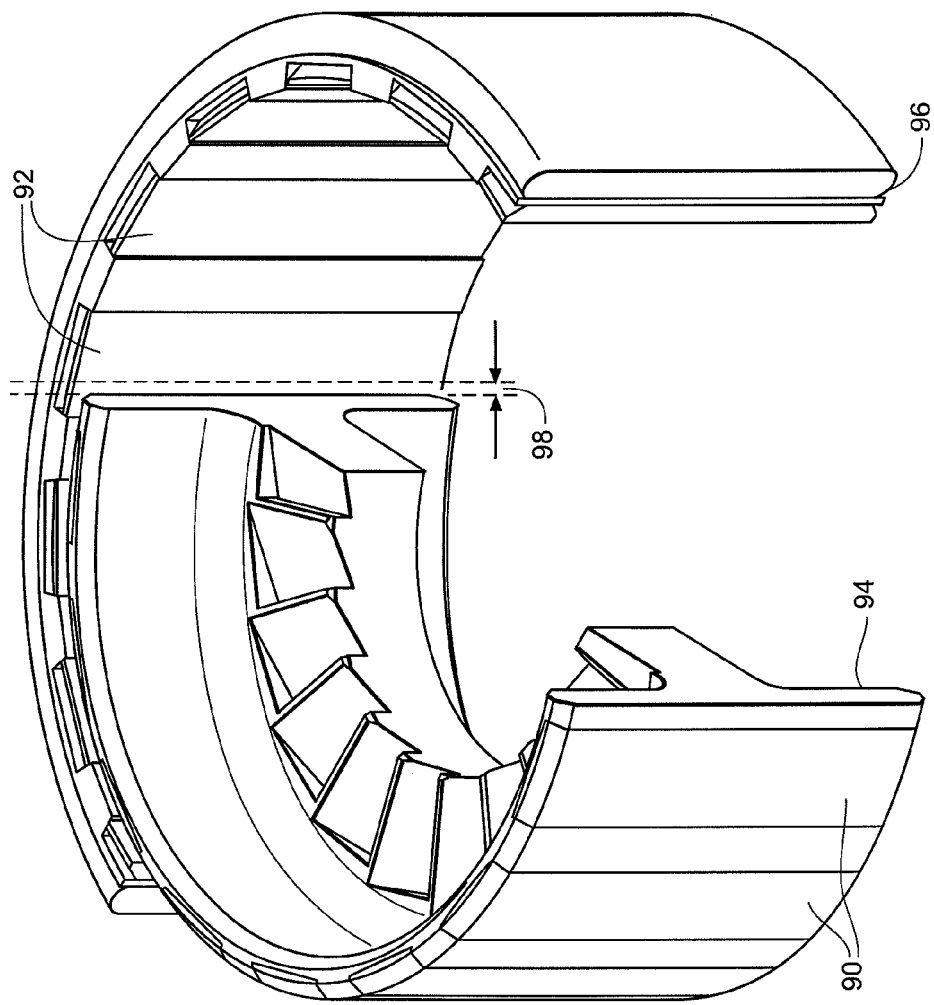
FIG. 7 is a further perspective view of the generator cross-section of FIG. 6, with outer and exterior portions of the generator rotated at different positions with respect to each other.
Figure 8:
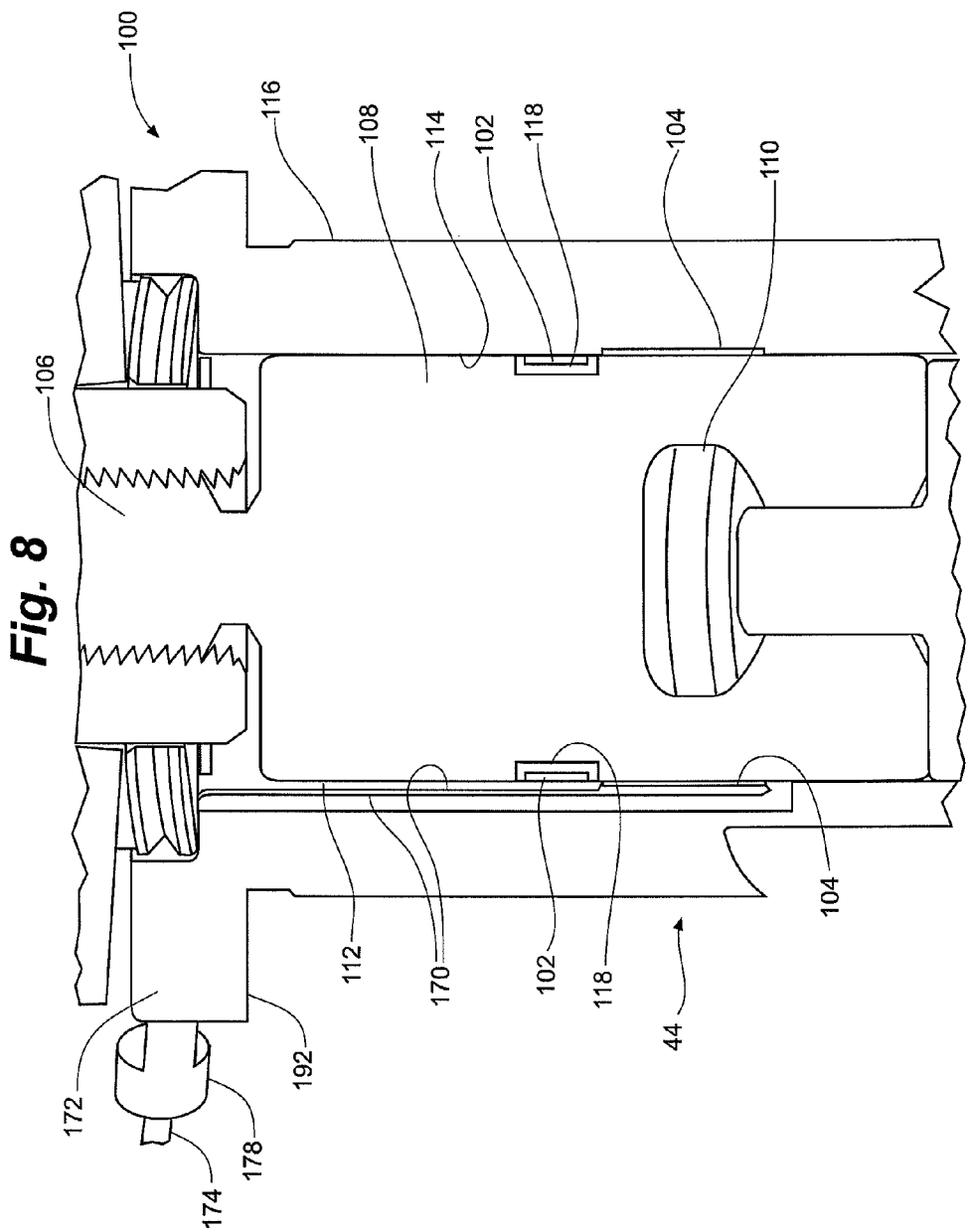
FIG. 8 is a cross-sectional perspective view of a tool assembly in accordance with certain embodiments of the invention.
Figure 9:
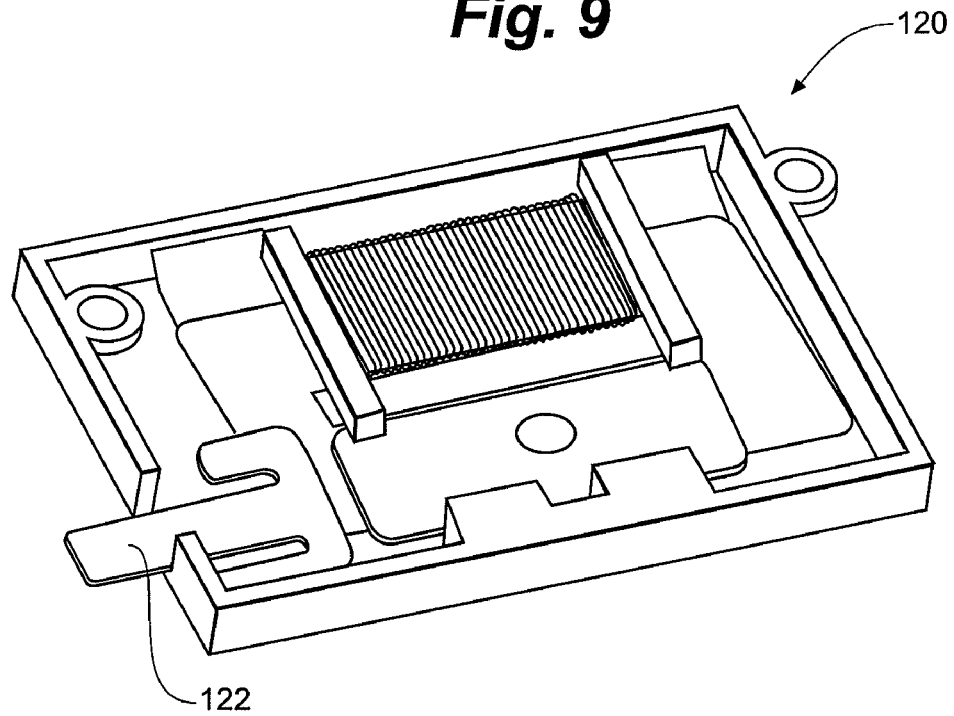
FIG. 9 is a perspective view of an exemplary modular generator that can be used in the tool assemblies of FIGS. 2-8 in accordance with certain embodiments of the invention.

Such energy transformation, in certain embodiments, can be provided by using a generator, e.g., such as the generator 42 referenced in FIGS. 2-7, the generator 44 referenced in FIG. 8, or other similarly functioning generators as exemplified in FIG. 9. It should be appreciated that FIGS. 2-7 show the generator 42 in a generally horizontal orientation; however, the invention should not be limited to such. Instead, the generator 42 could be mounted vertically and driven by a rack gear or connecting rod system of the tool 40, as would be understood by the skilled artisan. It should also be appreciated that other energy types, besides kinetic mechanical energy, can also be derived from the tool's acceleration. In turn, in certain embodiments, generators that can transform one or more of these other energy types into electrical energy can be used with a tool assembly (such as the tool assembly 38). Such generators are exemplified in FIGS. 10 and 11.

In turn, as described below with reference to FIGS. 2-3, 8, and 12-18, such transformed energy can be used to power a tool tip 46 (exemplarily shown as a tap) for current or future operation with respect to the workpiece 16 (as shown in FIG. 1). As such, in certain embodiments, the electrical energy can be directed to a motor 48 used for actuating the tool tip 46 (as described below with reference to FIG. 12B), or can be directed to a motor of one or more further tool assemblies for actuating tool tips therein (as described below with reference to FIGS. 8 and 13-14). Alternatively, in certain embodiments, as described below with reference to FIGS. 16-18, the transformed energy can be routed to, and stored in, a reserve. In certain embodiments, the reserve can be located on or remote to the tool assembly 38, or on one or more further tool assemblies. In certain embodiments, the electrical energy stored in the reserve can be used by the motor 48 for actuating the tool tip 46 of the tool assembly 38, or can be used for powering a motor in one or more further tool assemblies for actuating tool tips therein.

Figure 3:
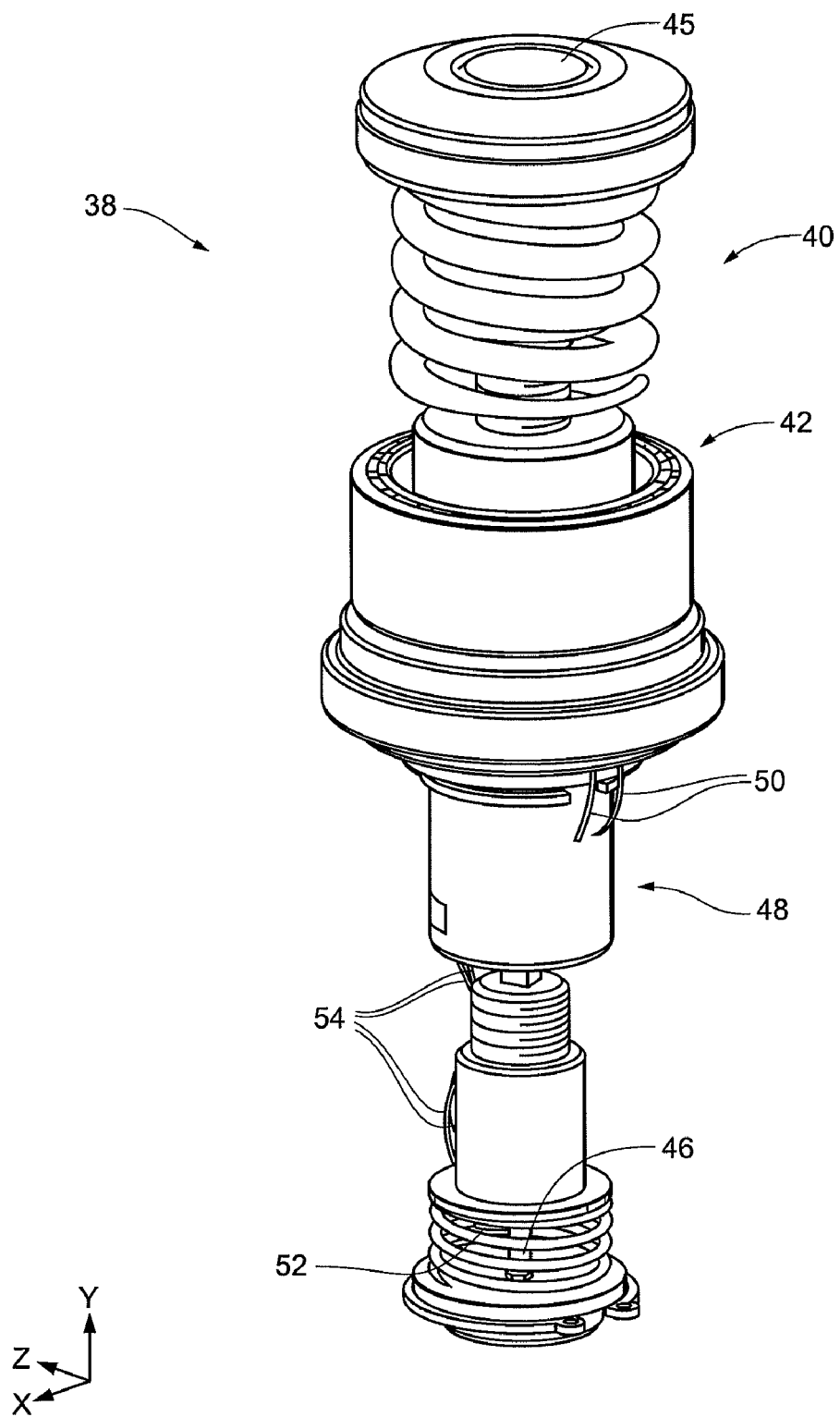
FIG. 3 is a perspective view of the tool assembly of FIG. 2, shown outside of its press portion and its upper and lower housings in accordance with certain embodiments of the invention.

FIG. 3 is a side perspective view of the tool assembly 38 of FIG. 2 according to certain embodiments of the invention. As shown in FIG. 2, while much of the tool assembly 38 is contained within upper and lower housings, 41 and 43, respectively, FIG. 3 is shown without these housings, as well as the upper turret 12 of the ram-driven press, in order to more clearly illustrate the portions of the assembly 38 involving the generator 42 and the motor 48. In certain embodiments, electrical conductors 50, generally contained within the housings 41 and 43 of the tool assembly 38, can be used to route the electrical energy from the generator 42 to the motor 48. Flow of the electrical energy from the generator 42, in certain embodiments, as further described below, can be triggered by activation of a switch 52 located proximate to the tool tip 46, with the switch 52 electrically connected to the motor 48 via electrical conductors 54.

While not shown in FIG. 3, in certain embodiments, other sets of electrical conductors (not shown) can be provided to facilitate flow of electrical energy from the generator 42 to a reserve (not shown) as well as to provide for transmission of electrical energy from the reserve to the motor 48. Flow of the electrical energy from the reserve to the motor 48, in certain embodiments, as further described below, can be prompted by activation of the switch 52, with the switch 52 electrically connected to the reserve via the electrical conductors 54.

Figure 4A:
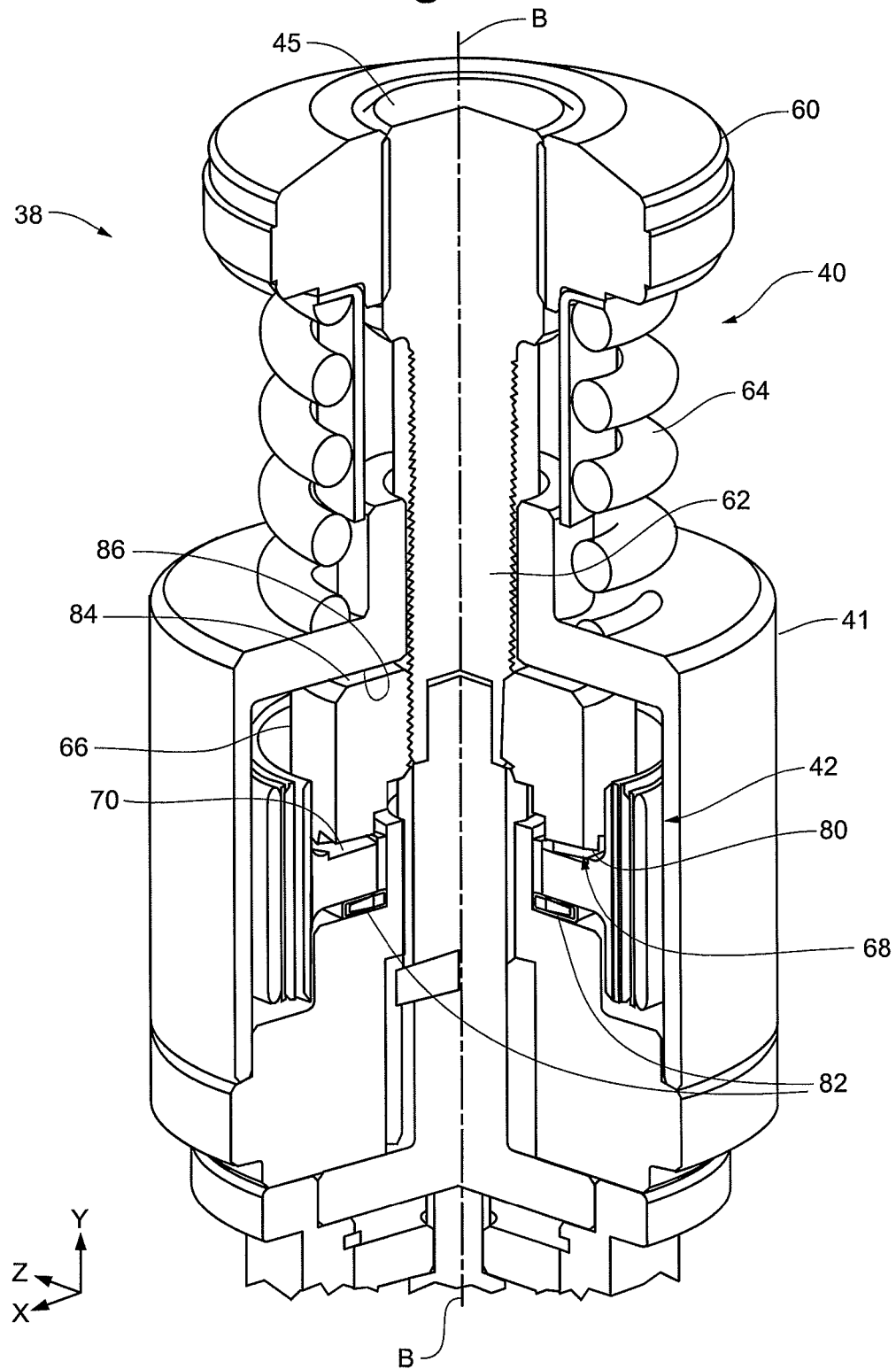
FIGS. 4A and 4B are perspective views of upper portions of the tool assembly of FIGS. 2 and 3, respectively, each having a front section of the tool assembly cut away.
Figure 4B:
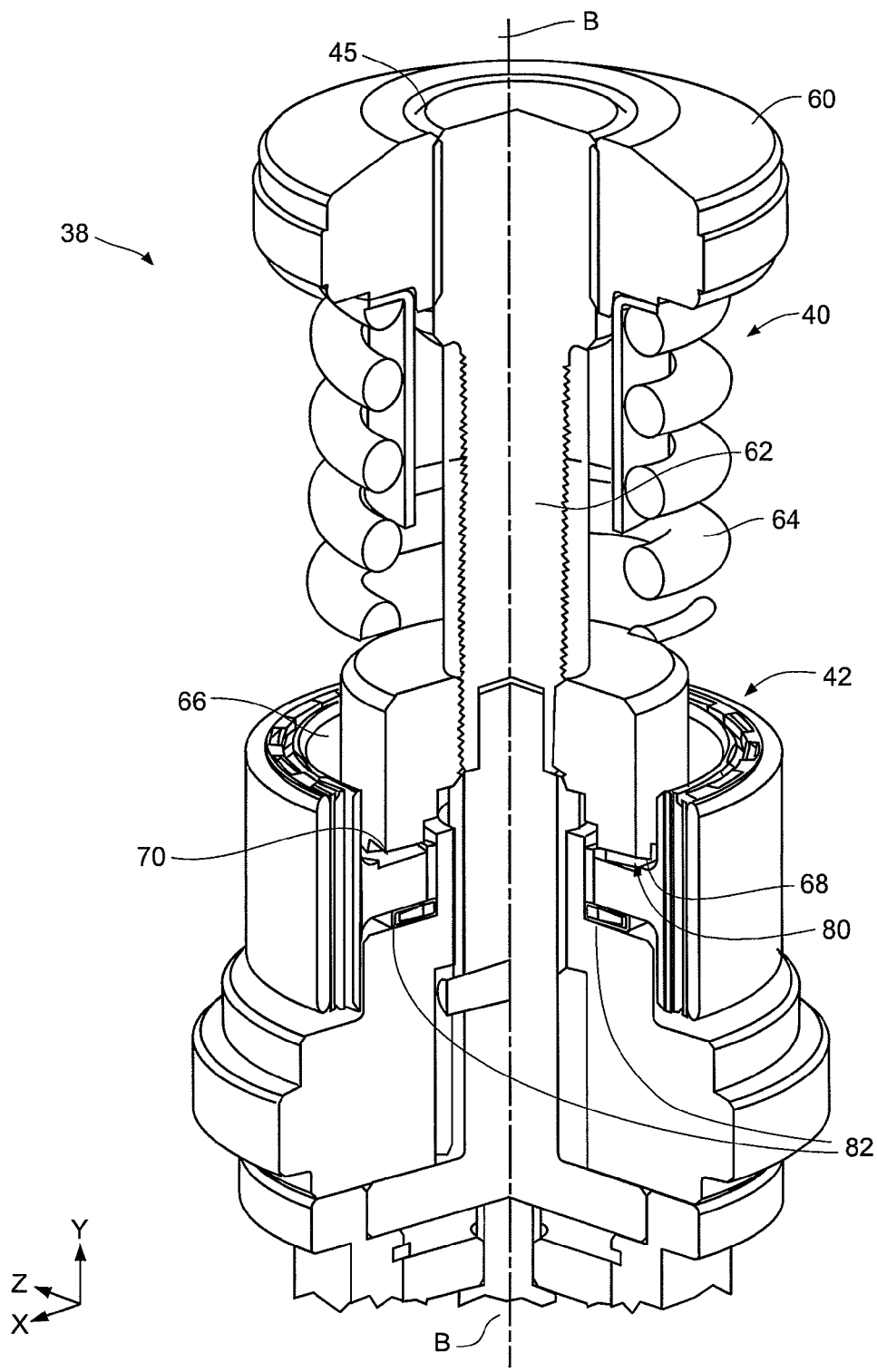

FIGS. 4A and 4B are perspective views of upper portions of the tool assembly 38 of FIGS. 2 and 3, respectively. The tool assembly 38 in each of FIGS. 4A and 4B is shown with a front section cut away to illustrate apparatus and functioning of the assembly 38 in accordance with certain embodiments of the invention. While FIGS. 4A and 4B illustrate the tool assembly 38 outside of a press, the skilled artisan should appreciate that, in certain embodiments, the tool assembly 38 can be provided in combination with a metal-fabricating press, where the tool assembly is operably mounted on the press, e.g., the turret-style press of FIG. 1 or other metal-fabricating press.

As illustrated in FIG. 4A, the generator 42 is located within the upper housing 41 of the tool assembly 38. The tool 40 includes a head 60 having striking surface 45 upon which the press ram (not shown) is driven to initiate acceleration of the tool 40. The tool 40 has an axis B, along which a shaft 62 of the tool 40 moves downward during the tool's acceleration. A spring 64 is located between the head 60 and the upper housing 41 so as to encompass the shaft 62. As is known, the spring 64 compresses due to the downward force of the ram stroke, but recoils shortly following such ram stroke, thereby propelling the head 60 and shaft 62 of the tool 40 axially upward to reset the tool 40 for future strikes by the ram.

With reference to FIGS. 4A and 4B, the tool assembly 38 includes a driven body 66 which is coupled with the shaft 62. In certain embodiments, the driven body 66 is rotatably coupled with the shaft 62 such that if a lower surface 68 of the driven body 66 is engaged, the driven body 66 rotates about the shaft in a counter-clockwise direction. In certain embodiments, as shown, the rotatable coupling between the shaft 62 and the driven body 66 involves the driven body 66 being threadably received onto the shaft 62. Upon acceleration of the tool 40 from the ram stroke and corresponding downward axial movement of the shaft 62 along axis B, the lower surface 68 of the driven body 66 engages with a flywheel 70 incorporated into the tool 40. As shown in FIG. 4A, in certain embodiments, the flywheel 70 is located within the housing 41 of the tool 40. While the driven body 66, when engaged, is described above as rotating in a counter-clockwise direction, it should be appreciated that, depending on the tool need, the driven body 66 can be alternatively configured to rotate in a clockwise direction just as well.

Figure 5:
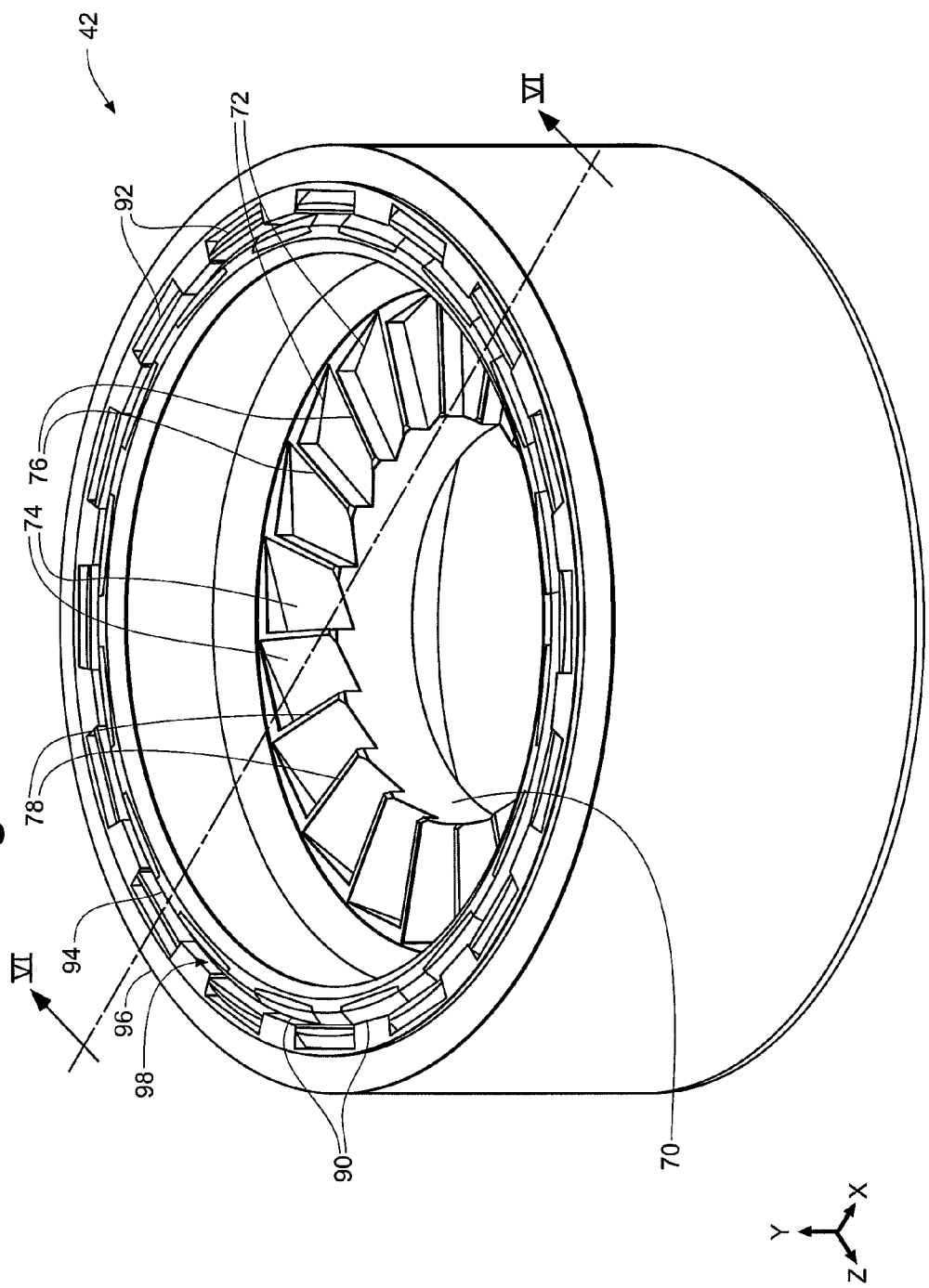
FIG. 5 is a perspective view of a generator for the tool assemblies of FIGS. 2-4 in accordance with certain embodiments of the invention.

FIG. 5 is a perspective view of the generator 42 in accordance with certain embodiments of the invention. As shown and described below, in certain embodiments, the flywheel 70 can be incorporated with the generator 42. In certain embodiments, as illustrated, the upper surface of the flywheel 70 has a plurality of pawls 72 that are evenly staggered in a circular arrangement. Each pawl 72 is formed as a step having an upwardly slanted surface 74 that terminates along an edge 76, and drops sharply downward therefrom, whereat the slanting surface 74 for another pawl 72 starts. In certain embodiments, each pawl edge 76 has a lip 78 extending from the edge 76 to serve as a retaining 'catch' for one or more corresponding, but oppositely-directed pawls 80 (shown in FIGS. 4A and 4B) that are evenly staggered in a circular arrangement on the lower surface 68 of the driven body 66.

From the axial movement of the tool shaft 62 (resulting from the tool's acceleration), the driven body 66 begins to rotate on the shaft 62. Such rotation of the driven body 66 leads to a coupling of the driven body 66 and the flywheel 70, and a collective rotation of both the driven body 66 and the flywheel 70. As such, in response to the axial movement of the tool shaft 62, the flywheel undergoes rotary motion. Particularly, in certain embodiments, the axial movement of the shaft 62 causes the driven body 66, which is coupled with the shaft 62, to rotate, and when the driven body 66 is coupled with the flywheel 70 as described above, the rotation of the driven body 66 mechanically urges the flywheel 70 into rotary motion.

In certain embodiments, as shown, the driven body 66 is coupled with the flywheel 70 by virtue of at least one pawl 72 adapted to transfer force from the driven body 66 to the flywheel 70 so as to set the flywheel 70 in motion. In particular, as the driven body 66 starts to rotate, at least one of the pawls 80 on its lower surface 68 catches the lip 78 of one of the pawls 72 on the flywheel 70. In turn, one or more of the pawls 80 on the driven body 66 are found to be received within one or more of the pawls 72 on the flywheel 70. Consequently, rotation of the driven body 66 in the counter-clockwise direction mechanically urges the flywheel 70 into a similar rotary motion. Thus, as described above, when the driven body 66 and flywheel 70 are coupled, as described above (via engagement of at least one each of the pawls 72 and 80), the driven body 66 is adapted to transfer force from the driven body 66 to the flywheel 70 to set the flywheel 70 in motion. In turn, as the driven body 66 rotates in a counter-clockwise direction, so too does the flywheel 70. In certain embodiments, as shown, a thrust bearing 82 is located underneath the flywheel 70, serving as a functional platform for the flywheel 70 during its rotation.

As described above, in certain embodiments, when the press ram (not shown) is driven into the tool head 60 to initiate acceleration of the tool 40, the shaft 62 of the tool 40 is axially moved, which causes the flywheel 70 and driven body 66 of the tool 40 to couple and to undergo rotary motion. Upon recoil of the spring 64 shortly following the ram stroke, the head 60 and shaft 62 of the tool 40 are propelled axially upward, thus lifting the lower surface 68 of the driven body 66 axially upward from the flywheel 70 (as shown in FIG. 2). In turn, the driven body 66 and the flywheel 70 become uncoupled. With reference to FIG. 4A, as the lower surface 68 of the driven body 66 is lifted axially upward by the shaft 62, an upper surface 84 of the driven body 66 comes into contact with an upper inner surface 86 of the upper housing 41. Accordingly, the driven body 66 starts to rotate along the shaft 62 in a clockwise direction, thereby moving axially downward along the threading of the shaft 62 until the spring is fully recoiled and the head 60 and shaft 62 of the tool 40 are reset for further strikes from the press ram.

As noted above, in certain embodiments, the tool assembly 38 can be adapted to transform kinetic mechanical energy derived from acceleration of the tool 40 into electrical energy. The description provided above with reference to FIGS. 2-5 details but one embodiment of the invention whereby such kinetic mechanical energy can be derived. While the above description details the tool shaft 62, the driven body 66, and the flywheel 70 working collectively to set the flywheel 70 in motion, it should be appreciated that a variety of other techniques can be used in deriving kinetic mechanical energy from the tool's acceleration while still falling within the spirit of the invention. As is known, acceleration of the tool 40 involves movement of at least one component of the tool 40. Moveable components of the tool 40 exemplified above include the head 60, the shaft 62, the spring 64, the driven body 66, and the flywheel 70. Accordingly, it should be appreciated that kinetic mechanical energy can be derived from the movement of any one, or combination, of these tool components (e.g., the axial movement of the tool shaft 62, the rotary motion of the driven body 66, etc.), with such energy being transformed into electrical energy.

In certain embodiments, the transformation of kinetic mechanical energy derived from acceleration of the tool 40 into electrical energy is provided by use of the generator 42 (shown in FIGS. 2-5). In accordance with certain embodiments of the invention, FIG. 6 is a cross-sectional view of the generator 42 of FIG. 5, while FIG. 7 shows an alternate view of the generator 42 of FIG. 6 with outer and exterior portions of the generator 42 illustrated in different positions with respect to each other. In certain embodiments, the generator 42 includes one or more magnets 90 and a coil 92. As illustrated, in certain embodiments, the flywheel 70 has a ring-shaped outer wall 94, wherein a series of the magnets 90 are disposed and evenly spaced along an outer surface of the wall 94. The coil 92, in certain embodiments, is disposed in a ring-shaped exterior wall 96, which surrounds the outer wall 94 yet is separated therefrom by an air gap 98. Each of the magnets 90, in certain embodiments, as shown in FIG. 7, is panel-shaped and extends from a lower edge to an upper edge of the outer wall 94. It should be understood that the magnets 90 can be sized and shaped as desired, but should be of a quantity and/or size so as to collectively generate a magnetic field around the generator 42.

As described above, in certain embodiments, when a ram strikes the tool head 60 and thereby accelerates the tool 40, the shaft 62 of the tool 40 moves axially, and results in rotary motion of the flywheel 70. Particularly, in certain embodiments, the axial movement of the tool shaft 62 results in rotary motion of the driven body 66, coupling of the driven body 66 with the flywheel 70, and corresponding rotary motion of the flywheel 70. The rotation of the flywheel 70 results in corresponding rotation of the outer wall 94 and the magnets 90 disposed therein. However, because of the air gap 98 between the outer wall 94 (retaining the magnets 90) and the exterior wall 96 (retaining the coil 92), the exterior wall 96 does not rotate, but remains stationary.

As noted above, the magnets 90 of the outer wall 94 collectively create a magnetic field existing proximate to the generator 42 when the magnets 90 are at rest. However, as those skilled in the art would appreciate, as the magnets 90 rotate with respect to the coil 92, the magnetic field is found to change. Based on Faraday's law, this change in magnetic field strength of the environment surrounding the generator 42 causes a corresponding change in the magnetic flux through the coil 92. Accordingly, electrical energy, i.e., voltage, is 'induced' in the coil 92. Because the magnets 90 continually rotate with respect to the coil 92 (as a result of the flywheel's rotation), the magnetic field proximate to the generator 42 is continually altered. Consequently, the magnetic field strength of the environment surrounding the generator 42 is continually varied, resulting in corresponding continual magnetic flux change through the coil 92 and continual 'inducement' of voltage in the coil 92.

Thus, as described above, in certain embodiments, movement of the shaft 62 along the axis B (during acceleration of the tool 40) results in rotation of the magnets 90 (with respect to the coil 92) about the axis B, thereby creating electrical energy. As further described, the electrical energy is created in the coil 92 in the form of voltage. As such, in certain embodiments, when the tool assembly 38 is used on a press having a ram, the generator 42 (via the magnets 90 and the coil 92) is adapted to transform kinetic mechanical energy (resulting from acceleration of the tool 40 by the ram striking the tool 40) into electrical energy.

As should be appreciated, the description provided above with reference to FIGS. 2-7 details but one embodiment of the invention whereby kinetic mechanical energy derived from acceleration of the tool 40 can be transformed to electrical energy. While the above description details rotation of the magnets 92 with respect to the coil 94 causing transformation of the kinetic mechanical energy into electrical energy, a variety of other methods can be used and still fall within the spirit of the invention. It should be appreciated that any change in the magnetic environment around the generator 42 would cause a voltage to be induced in the coil 94, including moving a magnet toward or away from the coil 94, moving the coil 94 into or out of the magnetic field, rotating the coil 94 relative to a magnet, etc. Thus, in certain embodiments, as opposed to being rotated (as exemplified above), one or more magnets could instead be moved linearly with respect to the coil 94. FIG. 8, as described below, illustrates an exemplary technique.

As shown, FIG. 8 is an elevation cross-sectional view of a press tool assembly 100 in accordance with certain embodiments of the invention. Similar to the tool assembly 38 of FIGS. 2-7, the tool assembly 100 of FIG. 8 has a generator 44 having one or more magnets 102 and a coil 104. However, instead of rotating the magnets 102 in response to acceleration of the tool, the magnets 102 are moved linearly. In certain embodiments, the tool assembly 100 functions similar to that of the tool assembly 38 in that its tool is accelerated from a ram stroke. However, instead of configuring the tool components to rotate a driven body or flywheel of the tool, the tool components of FIG. 8 are primarily moved linearly.

With reference to FIG. 8, as the ram (not shown) strikes a tool head (not shown) of the tool assembly 100, the tool shaft 106 is directed axially downward on a driven body 108, with the driven body 108 being driven downward in conjunction with a punch driver 110. Upon recoil of a spring (not shown, but understood to pull the tool head and tool shaft 106 axially upward upon recoil), the tool head and tool shaft 106 become reset for future ram strikes. As shown, in certain embodiments, the magnets 102 are disposed on the outer surface 112 of the driven body 108, while the coil 104 is disposed on the inner surface 114 of a lower housing 116 of the tool assembly 100. In certain embodiments, as illustrated, insulators 118 are provided between the driven body 108 and the magnets 102, so as to direct the magnetic field toward the inner surface 114 of the lower housing 116 (i.e., toward the coil 104). Accordingly, as the driven body 108 moves axially downward from the tool's acceleration, the magnets 102 are moved linearly with respect to the coil 104. In turn, as the driven body 108 is retracted (due to a spring's recoil, as described above), the magnets 102 again move linearly with respect to the coil 104. Similar to that already described above, this linear motion of the magnets 102 with respect to the coil 104 causes variance in the magnetic environment around the generator 44, and in turn, electrical energy, i.e., voltage, to be induced in the coil 104.

As should be appreciated, other generator configurations can be used to convert kinetic mechanical energy (from the tool's acceleration) in either of the tool assemblies 38 (of FIGS. 2-7) or 100 (of FIG. 8) instead of or in addition to the generators 42 and 44 described above. In certain embodiments, these generators, when modular, can be positioned within the tool assemblies 38 and 100, and adapted to transform the derived kinetic mechanical energy into electrical energy. An example of one such generator is the energy module ECO 100 commercially available from EnOcean (Oberhaching, Germany). A top perspective view of the ECO 100 module is illustrated in FIG. 9. As shown, the ECO 100 module, referenced as 120, is an electrical device that transforms linear motion of a lever 122 (extending from the module 120) into electrical energy. In certain embodiments, the lever 122 of the module 120 can be positioned proximate to any of the linearly moving tool components (for example, the tool shafts 62 or 106) of the tool assemblies 38 or 100 described above. In certain embodiments, a flexible protrusion can be positioned on the shaft 62 or 106 so that it triggers the lever 122 twice for every ram stroke (once for each downstroke of the tool shaft and another for each upstroke). In turn, in certain embodiments, the transformed energy from the module 120 can be transmitted to, and stored in, a reserve (not shown) located on or remote to the tool assemblies 38 or 100, for later use with respect to actuating its corresponding tool tip.

While the above description involves kinetic mechanical energy derived from a tool's acceleration to be transformed to electrical energy, it should be appreciated that the dynamic energy created from the tool's acceleration involves kinetic mechanical energy as well as a variety of other types of energy. For example, one such type includes vibration energy. Devices that are able to transform such vibration energy (or other energies derived from the tool's acceleration) into electrical energy could be used solely, or in addition to the generators 42, 44, and/or 120 described above, and thus, incorporated into the embodiments of the invention described herein. As such, in certain embodiments, the transformed energy from these devices can be used for actuating the tool tip, or routed to, and stored in, a reserve located on or remote to the tool assembly 38, for later use of the electrical energy.

Figure 10:
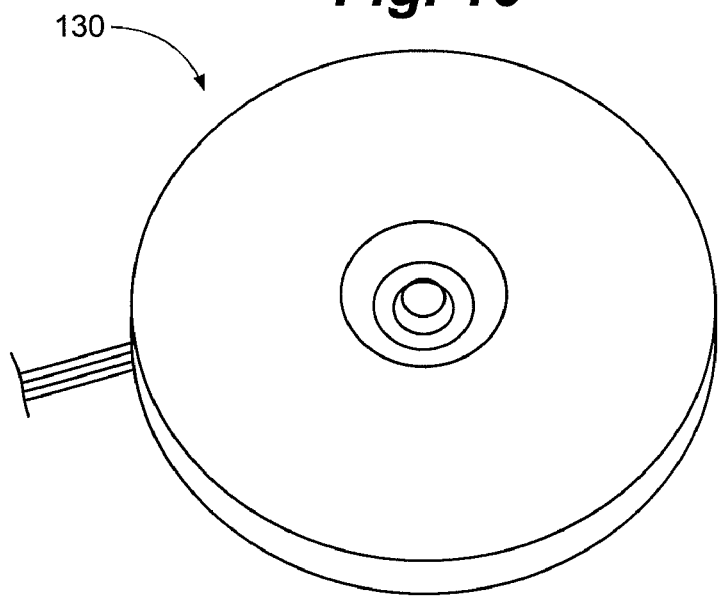
FIG. 10 is a perspective view of another exemplary modular generator that can be used in the tool assemblies of FIGS. 2-8 in accordance with certain embodiments of the invention.

For example, a vibration power harvesting device is currently being developed by KCF Technologies (State College, Pa., U.S.A.). A top perspective view of the KCF device is illustrated in FIG. 10. In certain embodiments, this circular device, referenced as 130, would measure about 1.9 inches wide and could be positioned on or within the tool assembly 38. Vibration energy from the tool's acceleration, in turn, could be transformed by the device into electrical energy. One aspect of this device that would make it particularly attractive is its wireless functionality with respect to emitting electrical signals. Using this functionality, the device could wirelessly transmit a signal to an 'active' tool, described in U.S. Patent Application Ser. No. 60/914,468, the disclosure of which is incorporated by reference herein in its entirety.

Figure 11:
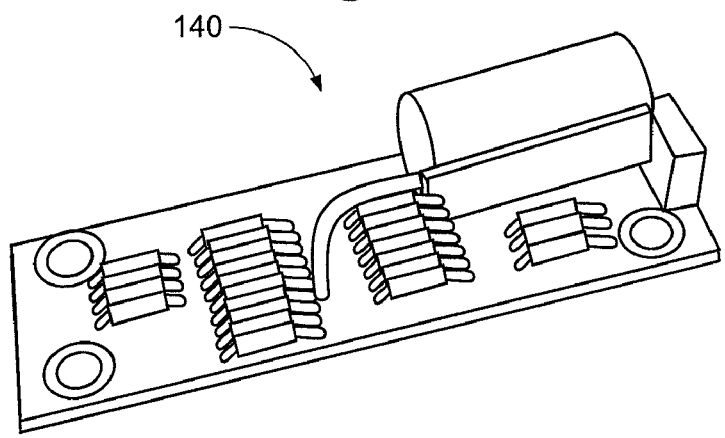
FIG. 11 is a perspective view of a further exemplary modular generator that can be used in the tool assemblies of FIGS. 2-8 in accordance with certain embodiments of the invention.

Other examples of such devices are the EH300/EH301 EPAD® Energy Harvesting™ modules, which are commercially available from Advanced Linear Devices, Inc. (Sunnyvale, Calif., U.S.A.). A top perspective view of an EH 300 module is illustrated in FIG. 11, and referenced as 140. Like the KCF device described above, the EPAD® modules are compact in size. As such, in certain embodiments, the modules can be positioned on or within the tool assembly 38. Vibration energy from the tool's acceleration, in turn, can be transformed by the modules into electrical energy. Similar to the KCF device described above, the EPAD® modules have wireless capability; as such, the modules can wirelessly transmit a signal to an 'active' tool, described in U.S. Patent Application Ser. No. 60/914,468. In addition, the modules have energy management functionality, which enables their circuits to capture very small energy packets that have been previously difficult to capture for use.

As briefly described above with reference to FIGS. 2 and 3, following transformation of energy derived from the tool's acceleration into electrical energy (i.e., voltage), in certain embodiments, the electrical energy can be delivered (i.e., in the form of current) from the generator 42 to a motor that is electrically coupled with the generator 42. In turn, such electrical energy (created by the generator 42) can be used to power the motor. In certain embodiments, the motor can be incorporated into the tool (as illustrated in FIGS. 2 and 3 with the motor 48 of the tool assembly 38, where such motor 48 is incorporated into the tool 40 and electrically coupled with the generator 42 via conductors 50). In turn, with reference to the tool assembly 38 of FIGS. 2 and 3, the motor 48 can be used to actuate the tool tip 46 of the tool assembly 38. Alternatively, in certain embodiments, the motor can be incorporated into a tool of a further tool assembly, as exemplified below. In turn, such motor can be used to actuate the tool tip of such further tool assembly. Alternatively, in certain embodiments, the electrical energy can be delivered (again, in the form of current) to a reserve adapted to store the electrical energy created by the generator 42, with the reserve being located on the tool assembly 38, remote to the tool assembly 38, or located on another tool assembly.

Figure 12A:
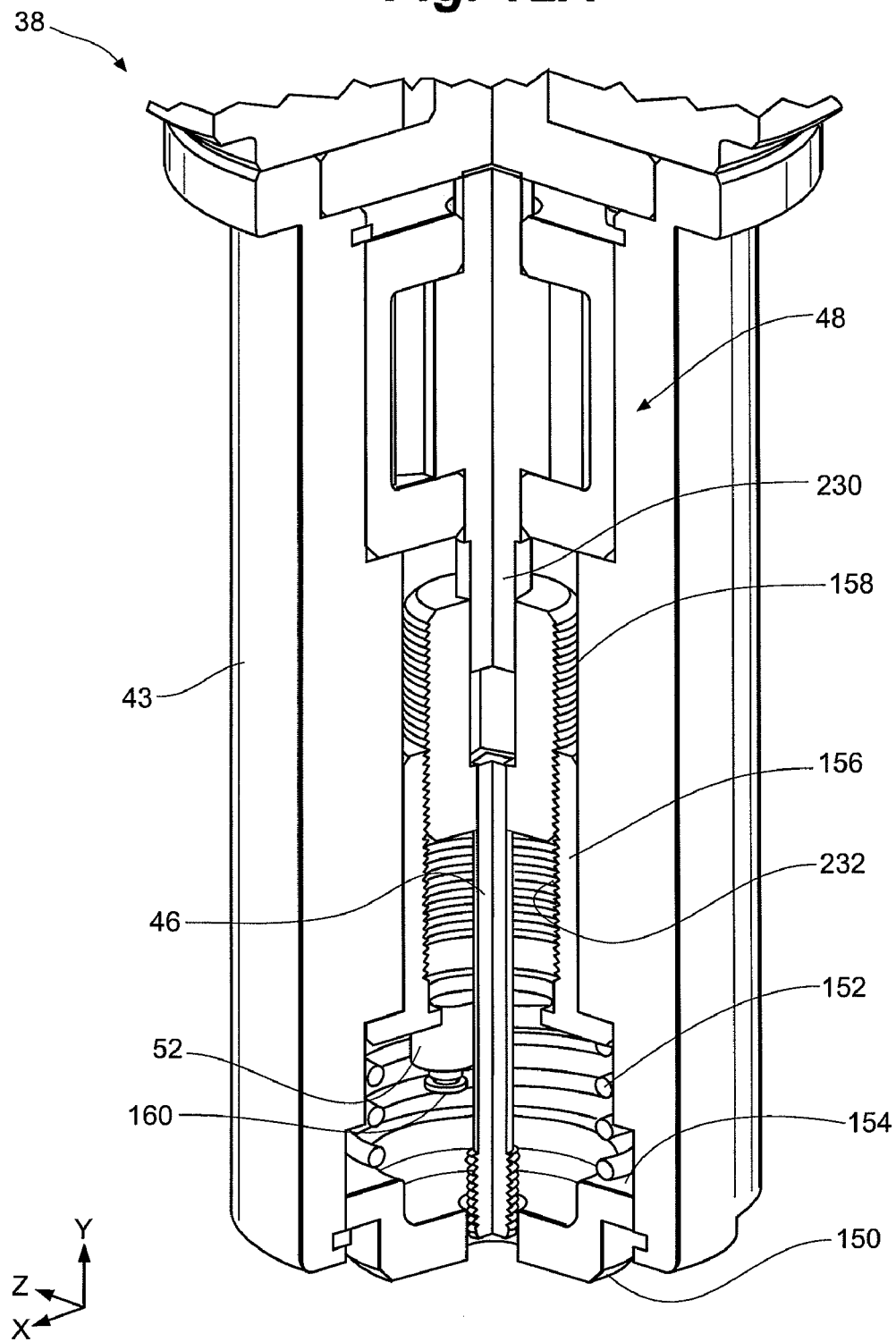
FIGS. 12A and 12B are perspective views of lower portions of the tool assembly of FIGS. 2 and 3, respectively, each having a front section of the tool assembly cut away.
Figure 12B:
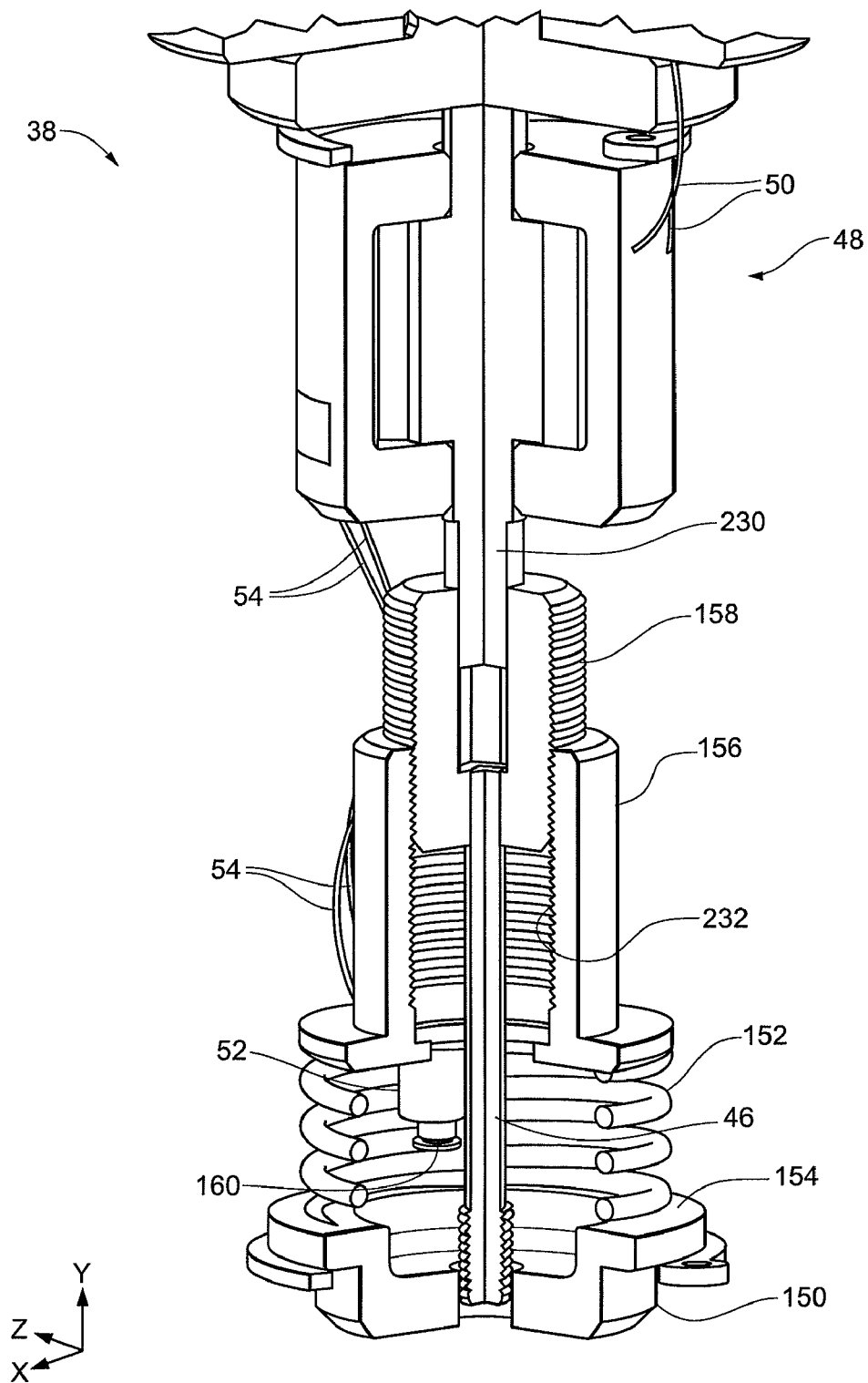

FIGS. 12A and 12B are perspective views of lower portions of the tool assembly 38 of FIGS. 2 and 3, respectively. The tool assembly 38 in each of FIGS. 12A and 12B is shown with a front section cut away to illustrate apparatus and functioning of the assembly 38 in accordance with certain embodiments of the invention. As illustrated, FIG. 12B shows one embodiment relating to the tool assembly 38 in which electrical energy can be routed to the motor 48 for actuation of the tool tip 46. The below description regarding FIGS. 12A and 12B relates to the generator 42 and corresponding tool assembly 38 of FIGS. 2-7; however, the invention should not be so limited. Instead, one skilled in the art should appreciate that the below description could just as well be used with any combination of the generators (e.g., the generator 44 of FIG. 8) as well as any different tool assemblies (e.g., the tool assembly 100 of FIG. 8) described above without departing from the spirit of the invention.

In certain embodiments, with reference to FIG. 12B, the tool assembly 38 includes the motor 48, which is incorporated into the tool 40. As described above, the motor 48 can be electrically coupled with the generator 42 via the electrical conductors 50. In turn, electrical energy, i.e., voltage, created by the generator 42 can be used to power the motor 48. In certain embodiments, the electrical energy created in the coil 92 by the generator 42 is normally prevented from powering the motor 48, e.g., by having an electrical circuit of the motor 48 normally open. One reason for normally preventing the powering of the motor is that the tool assembly 38 often needs to be properly positioned with respect to the workpiece 16 (shown in FIG. 1) prior to actuation of the tool tip 46. As should be appreciated, a variety of triggering events can be used in signaling readiness for an operation by the tool tip 46, and while one such triggering event is exemplified below, the invention should not be limited to such.

With reference to FIGS. 12A and 12B, in certain embodiments, one triggering event can involve application of a downward force on an end cap 150 at a lower end of the tool assembly 38. Such downward force could result from the tool assembly 38 being driven axially downward against the workpiece 16 (shown in FIG. 1). Upon the assembly 38 being driven axially downward, the end cap 150 correspondingly is forced axially upward. As a result, a retaining spring 152, held between an upper lip 154 of the end cap 150 and a collar 156 of the tool assembly 38, is compressed. In certain embodiments, provided that a sufficient amount of downward force is exerted on the end cap 150, the upper lip 154 contacts and triggers the switch 52. In certain embodiments, the switch 52 is a push button switch and is triggered via continual depression of the pushbutton 160; however, the invention should not be limited to such. For example, the switch 52, in certain embodiments, can be a three-way switch, enabling current to flow in one direction through the motor 48 to drive the tool tip 46 (when the switch is set in a first position), enabling current to flow in an opposite direction through the motor 48 to reverse drive the tool tip 46 (when the switch is set in a second position), or cutting off current flow through the motor 48 (when the switch is set in a third position).

In certain embodiments, with reference to FIG. 12B, triggering of the switch 52 can result in an electrical signal being transmitted to the circuit of the motor 48 (via the electrical conductors 54). Such signal results in the motor circuit closing, enabling current to flow from the generator 42 to the motor 48, thereby energizing the motor 48. Conversely, upon release of the downward force on the tool assembly 38, the retaining spring 152 recoils, causing the end cap 150 to move axially downward. Such downward motion of the end cap 150 results in its upper lip 154 releasing the pushbutton 160, thereby cutting off or reversing current flow between the generator 42 and the motor 48, depending on the design of the switch 52 (as exemplified above).

Figure 13:
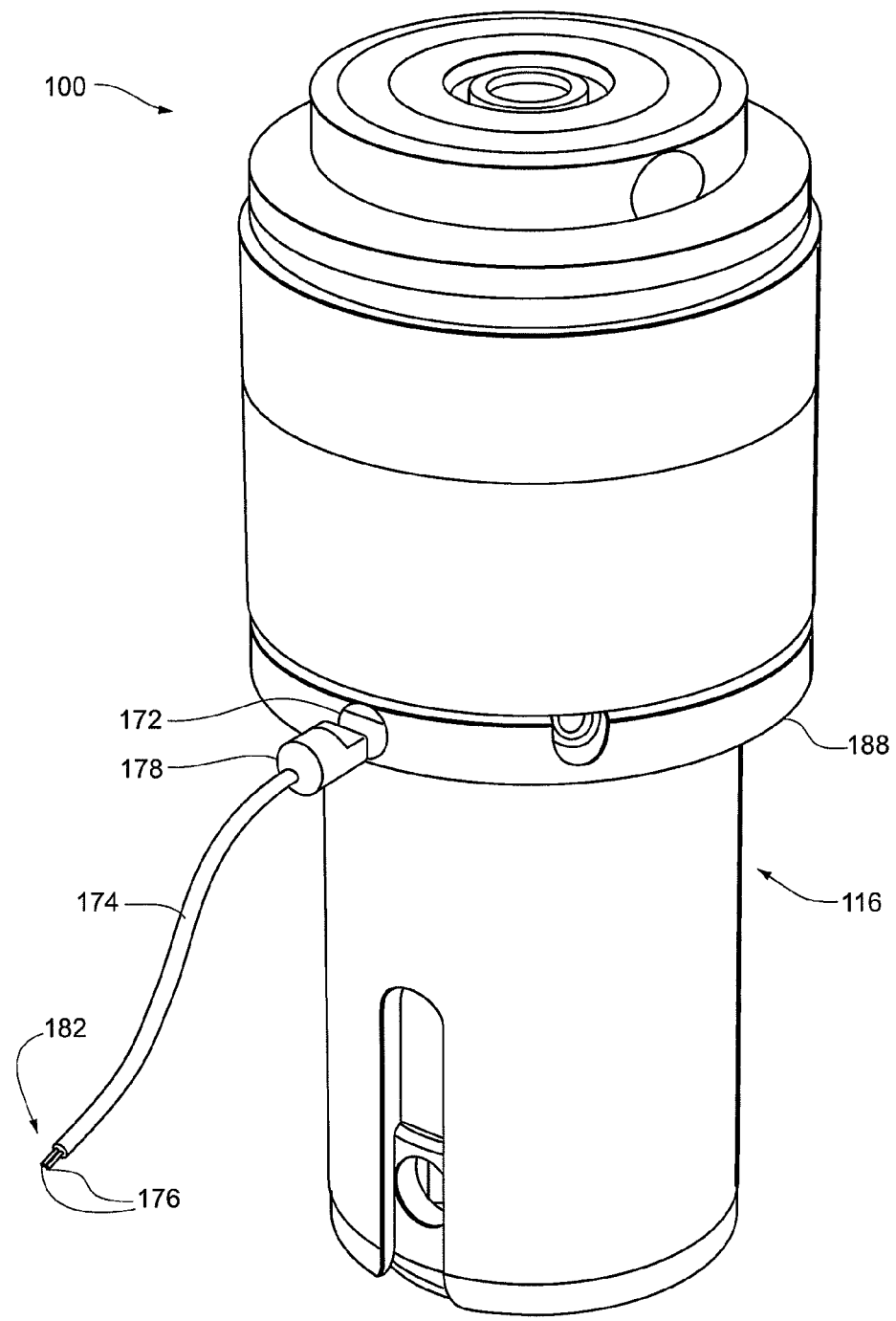
FIG. 13 is a perspective view of the tool assembly of FIG. 8 with a socket/plug configuration in accordance with certain embodiments of the invention.

FIG. 8, as described above, shows one embodiment in which the electrical energy generated by the generator 44 in the coil 104 can be delivered (in the form of current) to a motor on another tool assembly, or to a reserve either located remote to the tool assembly 100 or located on another tool assembly. FIG. 13 illustrates a perspective side view of the tool assembly 100 of FIG. 8 in accordance with certain embodiments of the invention. The below description regarding FIGS. 8 and 13 relates to the generator 44 and corresponding tool assembly 100; however, the invention should not be so limited. Instead, one skilled in the art should appreciate that the below description could just as well be used with any combination of the generators (e.g., the generator 42 of FIGS. 2-7) as well as any different tool assemblies (e.g., the tool assembly 38 of FIGS. 2-7) described above without departing from the spirit of the invention.

In certain embodiments, with reference to FIG. 8, electrical conductors 170 are used in connecting the coil 104 to electrical terminals of a socket 172 (visibly shown in FIG. 13) disposed on the housing of the tool assembly 100. A power cord 174, carrying electrical conductors 176, is used with the tool assembly 100 to route the electrical energy from the coil 104 outside the tool assembly 100. As illustrated, on at least one end thereof, the cord 174 has a plug 178 that can mate with the socket 172. In FIG. 13, the power cord 174 is shown as being spliced on an end 182 opposite the plug 178 in order to illustrate the conductors 176 therein. As should be appreciated, the conductors 176 within the cord 174 are connected to terminals within the plug 178. Thus, following mating of the electrical plug 178 with the electrical socket 172, their corresponding terminals are electrically connected, resulting in the conductors 170 (of the tool assembly 100) being electrically connected to the conductors 176 (of the power cord 174). In turn, as described above, the electrical energy from the coil 104 can be routed (as current) outside the tool assembly 100 (via the power cord 174) to be used or stored for later use.

Figure 14:
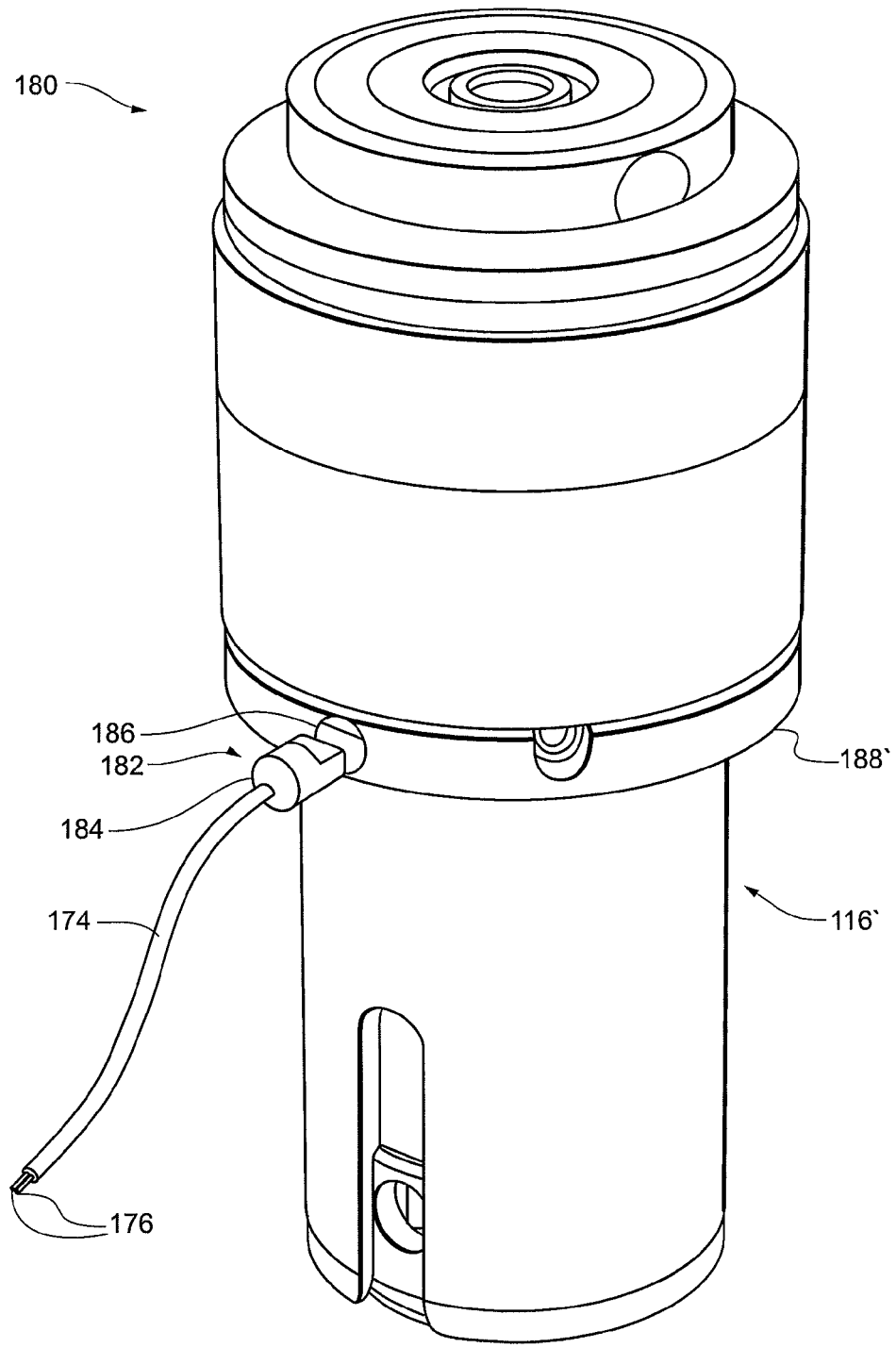
FIG. 14 is a perspective view of a further tool assembly with a socket/plug configuration in accordance with certain embodiments of the invention.
Figure 16A:
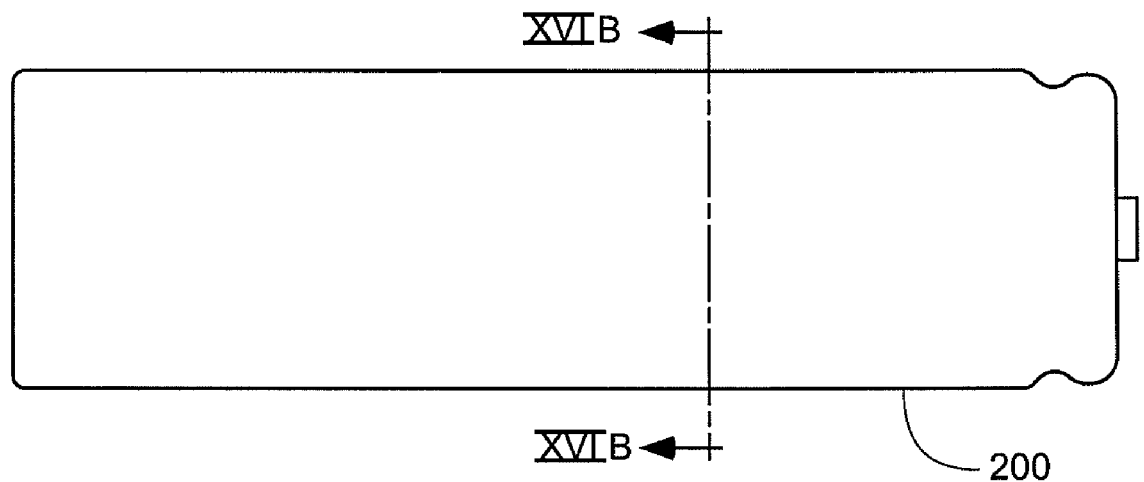
FIGS. 16A and 16B are elevation and cross-sectional views, respectively, of a rechargeable battery used as a reserve in accordance with certain embodiments of the invention.
Figure 16B:
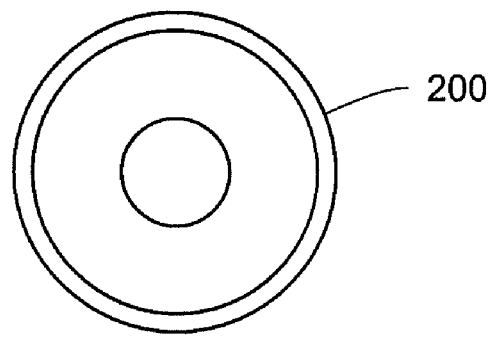

With reference to FIG. 13, in certain embodiments, the electrical energy routed outside the tool assembly 100 (via the power cord 174) can be delivered to a motor of a further tool assembly 180. FIG. 14 is a perspective view of such a further tool assembly 180 in accordance with certain embodiments of the invention. In certain embodiments, the end 182 of the power cord 174 opposite the plug 178 can have a further electrical plug 184. In turn, the further electrical plug 184 can be inserted into a corresponding electrical socket 186 of the further tool assembly 180. Accordingly, as described above, once the plug 184 is inserted in the socket 186, the conductors 176 (in the cord 174) can be connected to electrical conductors within the further tool assembly 180, which connect terminals of the socket 186 to the motor (not visibly shown) within the further tool assembly 180.

While not being shown, one skilled in the art would appreciate that the electrical connections with the motor of the further tool assembly 180 of FIG. 14 can be similar to that already described herein with respect to the motor 48 of the tool assembly 38 of FIG. 12B. However, instead of using the conductors for electrically connecting the generator 42 to the motor 48 (as shown in FIG. 12B with respect to the conductors 50), the conductors in the further tool assembly 180 would electrically connect the electrical socket 186 of the further tool assembly 180 to the motor of the further tool assembly 180. In turn, in certain embodiments, current flow from the generator coil 104 of the tool assembly 100 (of FIGS. 8 and 13) to the motor of the further tool assembly 180 can be triggered using the same tool components as already described above with respect to the tool assembly 38 of FIGS. 12A and 12B (e.g., the end cap 150 with upper lip 154, the switch 52, etc.), except with duplicates of such tool components being correspondingly included and used in the further tool assembly 180 with respect to its motor.

FIG. 15 is a perspective view of a tool assembly with a rotatable socket/plug configuration in accordance with certain embodiments of the invention. As shown in FIG. 13, the electrical socket 172 is disposed within an upper lip 188 of the lower housing 116 of the tool assembly 100. Likewise, FIG. 14 shows the electrical socket 186 being disposed within an upper lip 188' of the lower housing 116' of the tool assembly 180. Because these upper lips 188 and 188' are isolated away from the tool components of their respective tool assemblies 100 and 180, in certain embodiments, as shown in FIG. 15, a tool assembly 190 can be provided with a socket 192 (visibly hidden by the mating plug 194) that is radially rotatable around the tool assembly 190. This feature enhances the adaptability of the socket 192 to receive power from or deliver power to a plurality of other surrounding tool assemblies using a power cord with plugs. As shown, the rotatable socket 192 can be configured to rotate across a lower rail 196 and an upper rail 198 of an upper lip 202 of a lower housing 204 of the tool assembly 190.

With reference to FIG. 13, in certain embodiments, the electrical energy routed outside the tool assembly (via the power cord 174) can be delivered and stored in a reserve. The reserve can be a rechargeable power source, and as such, can be provided in a variety of configurations and types. In certain embodiments, the reserve can be a rechargeable battery. As is known, a wide variety of configurations and types of rechargeable batteries are commercially available; as such, the invention should not be limited to any such configuration or type. However, for exemplary purposes, one such configuration and type of battery is described below.

One type of rechargeable battery that can be exemplarily used in accordance with certain embodiments of the invention involves a low voltage compact lithium ion battery. A wide variety of configurations of low voltage compact lithium ion batteries are commercially available. One configuration of such a lithium ion battery that can be exemplarily used in accordance with certain embodiments of the invention is battery model no. CGR18650AF, commercially available from Panasonic (Kadoma City, Osaka, Japan). This battery, referenced herein as 200, is shown in elevation and cross-sectional view in FIGS. 16A and 16B, respectively. Per specifications from Panasonic, the battery 200 is about 2.57 inches long and 0.73 inch in diameter, and has a nominal voltage of about 3.6 volts.

Figure 18:
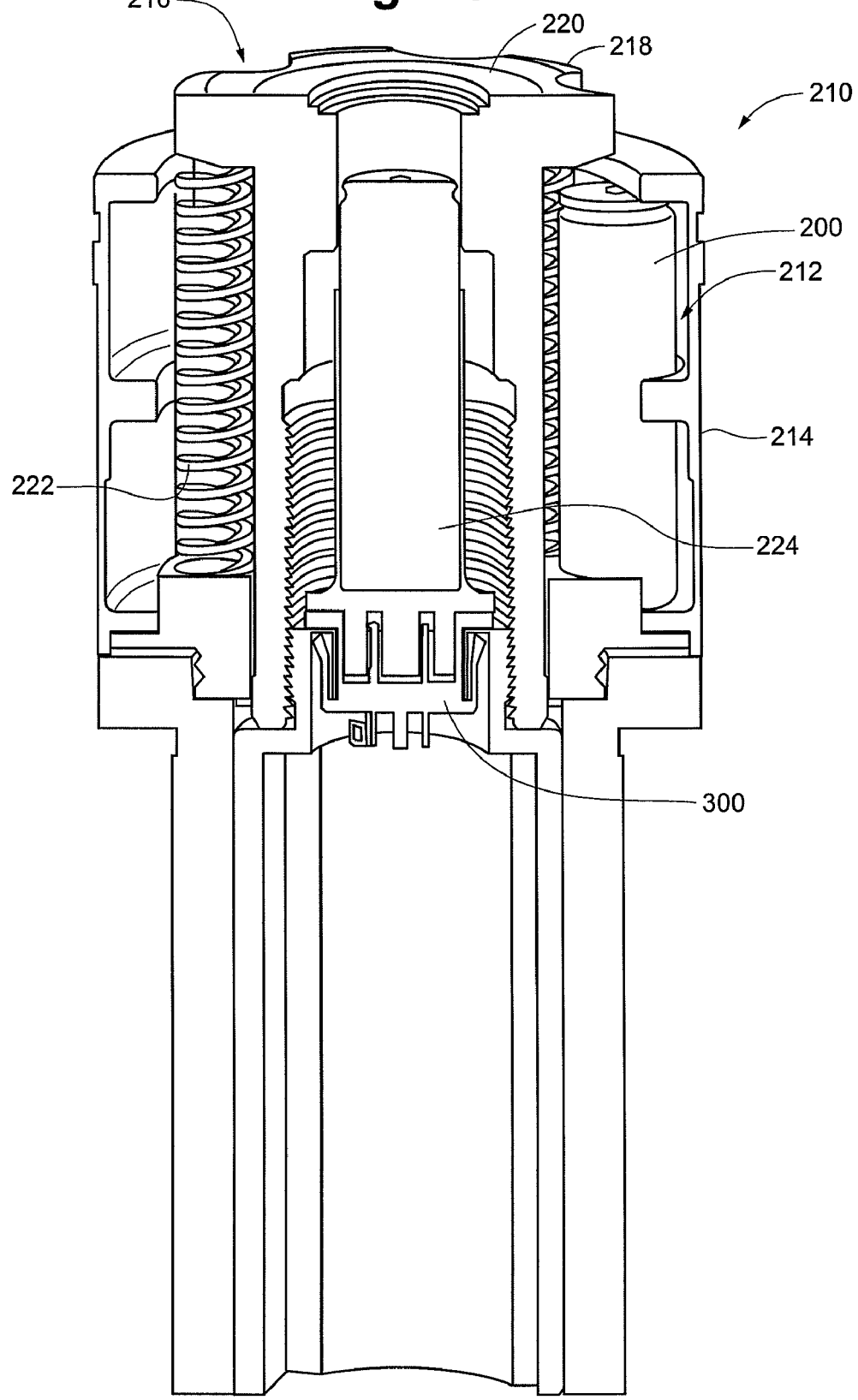
FIG. 18 is a cross-sectional perspective view of the tool assembly of FIG. 17, along the lines of XVIII-XVIII.

As described above, in certain embodiments, the reserve can be carried on another tool assembly or located remote from the tool assembly 100. Because the battery 200 is compact in size, in certain embodiments, the reserve can include a plurality of the batteries 200 electrically connected together and provided in a housing. FIG. 17 is a perspective view of an exemplary tool assembly having a reserve carried thereon in accordance with certain embodiments of the invention, while FIG. 18 is a cross sectional view of the exemplary tool assembly in accordance with certain embodiments of the invention. In certain embodiments, as shown, the tool assembly 210 has a reserve 212 that includes a plurality of batteries 200 contained within an upper housing 214 of the assembly 210. For convenience to the reader, the upper housing 214 is illustrated with transparent walls to allow the reader to see the configuration of the batteries 200 of the reserve 212 with respect to the upper tool portion of the tool assembly 210.

As shown, in certain embodiments, the tool head 216 is fan-shaped having segments 218 that extend radially outward from a striking surface 220 of the head 216. As such, the tool head 216 has a shape that can move axially downward around the batteries 200 following a ram (not shown) being driven against the striking surface 220 of the head 216. In turn, the head 216 drives a tool shaft 224 (shown in FIG. 18) of the tool assembly 210 while not interfering with the batteries 200 of the reserve 212. Accordingly, a plurality of tool springs 222 are provided so as to be positioned beneath outer ends of each of the segments 218 so as to facilitate the resetting of the tool head 216 and tool shaft 224 for future strikes by the ram.

In certain embodiments, the reserve 212 of the tool assembly 210 of FIGS. 17 and 18 receives electrical energy created from a generator on another tool assembly (e.g., the generator 44 on the tool assembly 100 shown in FIGS. 8 and 13). As such, the reserve is adapted to store electrical energy created by the generator. While not being shown, one skilled in the art would appreciate that the electrical connections from the batteries 200 of the reserve 212 to an electrical socket (not visibly shown) disposed on the tool assembly 210 can be similar to that already described herein with respect to the further tool assembly 180 of FIG. 14. However, instead of using conductors for electrically connecting the electrical socket to the motor, the conductors would electrically connect the electrical socket (not visibly shown) of the tool assembly 210 to the batteries 200 of the reserve 212 of the tool assembly 210. In turn, for example, current can freely flow from the generator coil 104 of the tool assembly 100 (of FIGS. 8 and 13) to the batteries 200 of the reserve 212 of the tool assembly 210.

In certain embodiments, the reserve 212 of the tool assembly 210 of FIGS. 17 and 18 receives electrical energy created from a generator on the tool assembly 210. While not being shown, one skilled in the art would appreciate that the generator 44 of FIG. 8 could be incorporated into the tool assembly 210. Accordingly, instead of electrical connections from the generator coil 104 to the electrical socket 172 (as shown and described with respect to FIGS. 8 and 13), electrical conductors can be routed between the generator coil 104 and the batteries 200 of the reserve 212. In turn, in certain embodiments, electrical energy created by the generator coil 104 could freely flow from the generator coil 104 to be stored within the batteries 200 of the reserve 212. Alternatively, in certain embodiments, the reserve 212 can be charged from an external AC or DC power source or a fuel cell (e.g., a hydrogen fuel cell) connected to a power port or electrical socket (not visibly shown) on the tool assembly 210 so as to deliver electrical energy (in the form of current) from the external power source to the batteries 200 of the reserve 212. Alternatively, in certain embodiments, such AC or DC power source or fuel cell can be incorporated into the tool assembly 210.

Thus, as should be appreciated, in certain embodiments, when incorporating a generator (e.g., such as the generator 44 of FIG. 8) into the tool assembly 210 of FIGS. 17 and 18, the tool assembly 210 would have a power source (e.g., the reserve 212). In turn, such tool assembly 210 can be adapted to provide a dual-charging capability characterized by the reserve 212 being chargeable by either of two charging methods. As described above, in certain embodiments, a first of the charging methods can involve use of the generator, where the generator is adapted to transform dynamic energy, created when a ram of the press (not shown) accelerates the tool of the tool assembly (e.g., as described above with respect to FIG. 8), into electrical energy, with such electrical energy being provided to the reserve 212 (e.g., as described above with respect to FIGS. 17 and 18). Further, in certain embodiments, a second of the charging methods can involve an external power source, as further exemplified above with respect to FIGS. 17 and 18.

It should be appreciated from FIG. 18 that the tool assembly 210 would not easily accommodate the generator 42 of the tool assembly 38 of FIGS. 2-7. Accordingly, while not shown, it would be appreciated by skilled artisans that a separate housing can be coupled to an exterior of the upper housing 41 of the tool assembly 38 and subsequently used as a reserve carried by the tool assembly 38. Further referenced in FIG. 18 is a connector or coupling 300 extending from the tool shaft 224. As shown, in certain embodiments, such a connector 300 can be used with the tool assembly 210 to enable various active tool tips to be readily plugged in and out of the connector 300. In turn, an operator can quickly switch from one tool tip to another for different operations on the workpiece, e.g., tapping, drilling, printing, bending, etc.

As described above with reference to the tool assembly 100 of FIGS. 8 and 13, in certain embodiments, electrical energy can be delivered from the generator coil 104 to a reserve located remote from the assembly 100. Such a reserve, if not carried in another tool assembly, can be located in a remote housing. As should be appreciated, such a remote housing can include one or more sockets (similar to that shown in FIGS. 13-14) so that mating plugs from power cords (similar to that shown in FIGS. 13-14) can be inserted therein to facilitate electrical energy being received and further delivered from the reserve in such remote housing.

As described above, following transformation of energy derived from the tool's acceleration into electrical energy (by one or more generators), in certain embodiments, the electrical energy can be delivered (i.e., in the form of electrical current) so as to energize a component of the tool, thereby causing the tool to act on a workpiece. In certain embodiments, such tool component can be a motor 48 which, as exemplified with FIGS. 2 and 3, can be carried in the same tool assembly 38 which houses the generator 42, or as exemplified with FIGS. 8 and 13-14, can be carried in a further tool assembly 180 not housing the generator 44. In certain embodiments, the motor 48 can be a straight motor or a motor having a gear box. As further described above, such delivery of electrical energy to the tool component can be made in a direct manner (e.g., from the generator to the tool component) as exemplified with respect to FIGS. 12A and 12B, or in an indirect manner (e.g., from the generator to a reserve located on or remote to the tool assembly for storage for future use) as exemplified with respect to FIGS. 8 and 13-18.

With reference to FIGS. 12A and 12B, in certain embodiments, upon being energized from the electrical energy, the tool component (shown as the motor 48) rotates a protruding member 230, which results in corresponding rotation of a coupling 158 that is threadably received within a collar 156. As shown, the coupling 158 is rigidly coupled with an upper portion of the tool tip 46. As such, upon rotation of the coupling 158 within threads of the collar 156, the coupling 158 axially moves downward (via rotation of the threads of the coupling 158 in the threads of the collar 156). As a result, the tool tip 46 is correspondingly moved axially downward to perform an operation or act on a workpiece. As described above, the tool tip 46 can be many different tool components depending on its operation. As such, in certain embodiments, depending on the tool tip type, the act of the tool tip can involve one of punching the workpiece, bending the workpiece, creating a form in the workpiece, rotary cutting of the workpiece, deburring the workpiece, tapping the workpiece, ink printing on the workpiece, spotwelding the workpiece, forming a swirl pattern on the workpiece, measuring the workpiece, and inspecting the workpiece. In addition, in certain embodiments, the tool tip 46 can incorporate laser technology, as is known in the art. As such, the tool tip 46 can involve, for example, a laser marking head or laser cutting head.

In certain embodiments, the coupling 158 continues to move axially downward until it contacts a switch 232 (not visibly shown) that is operatively coupled along the threads of the collar 156. In certain embodiments, the switch 232 is a toggle type switch. Upon triggering the switch 232, in certain embodiments, the polarity of the electrical energy to the motor is reversed. Accordingly, the motor 48 is caused to reverse the rotation of its protruding member 230, resulting in the coupling 158 to move axially upward in the threading of the collar 156, and a corresponding retraction of the tool tip 46 from its operation or act on the workpiece.

While a preferred embodiment of the present invention has been described, it should be understood that various changes, adaptations and modifications may be made therein without departing from the spirit of the invention and the scope of the appended claims.

What is claimed is:

1. A tool adapted for use on a metal-fabricating press having a ram configured to strike and accelerate the tool, the tool having a generator adapted to transform dynamic energy from a stroke of the ram into electrical energy, wherein the dynamic energy comprises kinetic mechanical energy and wherein the tool includes a flywheel that undergoes rotary motion in response to axial movement of a shaft of the tool.

2. The tool of claim 1 wherein the generator comprises a magnet and a coil.

3. The tool of claim 2 wherein the tool has an axis, and a shaft of the tool moves along the axis during said acceleration of the tool, and wherein in response to said axial movement of the shaft the magnet undergoes a relative rotation with respect to the coil about the axis, thereby creating the electrical energy.

4. The tool of claim 2 wherein the magnet is part of a series of magnets that undergo rotary motion in response to said acceleration of the tool.

5. The tool of claim 4 wherein the magnets are disposed on the flywheel.

6. The tool of claim 5, wherein the flywheel is incorporated into the tool.

7. The tool of claim 1 wherein the tool has a head that is driven by the ram to initiate said acceleration of the tool, the tool having a housing in which the flywheel is located, the tool having a spring located between the head and the housing, the spring encompassing the shaft.

8. The tool of claim 1 wherein said axial movement of the shaft causes a driven body, which is coupled with the shaft, to rotate, the driven body being coupled with the flywheel such that said rotation of the driven body mechanically urges the flywheel into rotary motion.

9. The tool of claim 8 wherein the driven body is coupled with the flywheel by virtue of at least one pawl adapted to transfer force from the driven body to the flywheel so as to set the flywheel in motion.

10. The tool of claim 1 wherein a motor is incorporated into the tool, the motor being electrically coupled with the generator such that electrical energy created by the generator can be used to power the motor.

11. The tool of claim 1 wherein the tool includes a reserve adapted to store electrical energy created by the generator.

12. The tool of claim 11 wherein the reserve is adapted to deliver electric current so as to energize a component of the tool, thereby causing the tool to act on a workpiece.

13. The tool of claim 12 wherein the tool is configured such that said act is selected from the group consisting of punching the workpiece, bending the workpiece, creating a form in the workpiece, rotary cutting of the workpiece, deburring the workpiece, tapping the workpiece, ink printing on the workpiece, spotwelding the workpiece, forming a swirl pattern on the workpiece, measuring the workpiece, and inspecting the workpiece.

14. The tool of claim 11 wherein the reserve comprises a rechargeable battery carried on the tool.

15. The tool of claim 1 wherein the generator is electrically coupled to a reserve remote from the tool, wherein electrical energy created by the generator is stored by the reserve, the reserve being adapted to deliver electric current so as to energize a component of the tool, thereby causing the tool to act on a workpiece.

16. The tool of claim 1 wherein said acceleration of the tool involves movement of at least one component of the tool.

17. The tool of claim 16 wherein said moveable component comprises a head of the tool.

18. The tool of claim 16 wherein said moveable component comprises a shaft that moves axially during said acceleration of the tool.

19. A tool and a metal-fabricating press in combination, the tool being operably mounted on the press, the press having a ram configured to accelerate the tool, the tool having a generator adapted to transform dynamic energy, created when the ram accelerates the tool, into electrical energy, wherein the tool includes a reserve adapted to store electrical energy created by the generator, the reserve comprising a rechargeable battery carried on the tool.

20. The combination of claim 19 wherein the dynamic energy comprises kinetic mechanical energy.

21. The combination of claim 19 wherein the press has a table with multiple stations each including a mount opening passing through the table, wherein the ram and the table are adapted for relative movement such that the ram can be selectively aligned with different stations of the table.

22. The combination of claim 21 wherein the press is a turret press, said table is an upper turret table, the turret press includes a lower turret table, and the upper and lower turret tables are rotatable about a vertical axis.

23. The combination of claim 20 wherein the generator comprises a magnet and a coil.

24. The combination of claim 23 wherein the tool has an axis, and a shaft of the tool moves along the axis during said acceleration of the tool, and wherein in response to said axial movement of the shaft the magnet undergoes a relative rotation with respect to the coil about the axis, thereby creating the electrical energy.

25. The combination of claim 20 wherein the tool includes a flywheel that undergoes rotary motion in response to axial movement of a shaft of the tool.

26. The combination of claim 25 wherein the tool has a head that is driven by the ram to initiate said acceleration of the tool, the tool having a housing in which the flywheel is located, the tool having a spring located between the head and the housing, the spring encompassing the shaft.

27. The combination of claim 25 wherein said axial movement of the shaft causes a driven body, which is coupled with the shaft, to rotate, the driven body being coupled with the flywheel such that said rotation of the driven body mechanically urges the flywheel into rotary motion.

28. The combination of claim 19 wherein a motor is incorporated into the tool, the motor being electrically coupled with the generator such that electrical energy created by the generator can be used to power the motor.

29. The combination of claim 19 wherein the reserve is adapted to deliver electric current so as to energize a component of the tool, thereby causing the tool to act on a workpiece.

30. The combination of claim 23 wherein the magnet is part of a series of magnets that undergo rotary motion in response to said acceleration of the tool.

31. The combination of claim 30 wherein the magnets are disposed on a flywheel incorporated into the tool.

32. The combination of claim 27 wherein the driven body is coupled with the flywheel by virtue of at least one pawl adapted to transfer force from the driven body to the flywheel so as to set the flywheel in motion.

33. The combination of claim 23 wherein the magnet moves linearly in response to said acceleration of the tool.

34. The combination of claim 29 wherein the tool is configured such that said act is selected from the group consisting of punching the workpiece, bending the workpiece, creating a form in the workpiece, rotary cutting of the workpiece, deburring the workpiece, tapping the workpiece, ink printing on the workpiece, spotwelding the workpiece, forming a swirl pattern on the workpiece, measuring the workpiece, and inspecting the workpiece.

35. The combination of claim 19 wherein said acceleration of the tool involves movement of at least one component of the tool.

36. A method of using a press, the method involving a tool and a metal-fabricating press in combination, the tool being operably mounted on the press, the press having a ram configured to strike and accelerate the tool, the tool having a generator adapted to transform kinetic mechanical energy, created when the ram accelerates the tool, into electrical energy, the method comprising actuating the ram of the press to accelerate the tool thereby causing the generator to transform said dynamic energy into electrical energy.

37. The method of claim 36 wherein dynamic energy comprises kinetic mechanical energy, and wherein the generator transforms the kinetic mechanical energy into said electrical energy.

38. The method of claim 36 wherein the tool includes a reserve, and the method comprises storing in the reserve electrical energy created by the generator.

39. The method of claim 38 wherein the method comprises delivering electric current from the reserve to energize a component of the tool, thereby causing the tool to act on a workpiece.

40. The method of claim 39 wherein said act is selected from the group consisting of punching the workpiece, bending the workpiece, creating a form in the workpiece, rotary cutting of the workpiece, deburring the workpiece, tapping the workpiece, ink printing on the workpiece, spotwelding the workpiece, forming a swirl pattern on the workpiece, measuring the workpiece, and inspecting the workpiece.

41. The method of claim 36 wherein a motor is incorporated into the tool and is electrically coupled with the generator, the method comprising powering the motor with electrical energy created by the generator.

42. The method of claim 37 wherein the generator comprises a magnet and a coil, the tool has an axis, and a shaft of the tool moves along the axis during said acceleration of the tool, and wherein in response to said axial movement of the shaft the magnet undergoes a relative rotation with respect to the coil about the axis, thereby creating the electrical energy.

43. The method of claim 37 wherein the tool has a flywheel that undergoes rotary motion in response to axial movement of a shaft of the tool.

44. The method of claim 43 wherein said axial movement of the shaft causes a driven body of the tool to rotate, the driven body being coupled with the flywheel such that said rotation of the driven body mechanically urges the flywheel into rotary motion.

45. The method of claim 44 wherein at least one pawl transfers force from the driven body to the flywheel and thereby mechanically sets the flywheel in motion.

46. A tool adapted for use on a metal-fabricating press, the tool having a power source, the power source being adapted to deliver electric current so as to energize a component of the tool, thereby causing the tool to act on a workpiece, wherein the power source comprises a reserve and the tool is adapted to s provide a dual-charging capability characterized by the reserve being chargeable by either of two charging methods, a first of the charging methods involving use of a generator incorporated into the tool, the generator being adapted to transform dynamic energy, created when a ram of the press accelerates the tool, into electrical energy, the electrical energy being provided to the reserve, a second of the charging methods involving an external source of AC or DC power being connected to a power port on the tool so as to deliver electric current from the external source to the reserve.

47. The tool of claim 46 wherein the dynamic energy comprises kinetic mechanical energy.

48. The tool of claim 46 wherein said component comprises a motor that is incorporated into the tool, the motor being electrically coupled with the power source such electric current from the power source can be used to power the motor.

49. The tool of claim 46 wherein the tool is configured such that said act is selected from the group consisting of punching the workpiece, bending the workpiece, creating a form in the workpiece, rotary cutting of the workpiece, deburring the workpiece, tapping the workpiece, ink printing on the workpiece, spotwelding the workpiece, forming a swirl pattern on the workpiece, measuring the workpiece, and inspecting the workpiece.

50. The tool of claim 46 wherein the power source is adapted to deliver electric current so as to energize a laser marking head of the tool.

51. The tool of claim 46 wherein the power source is adapted to deliver electric current so as to energize a laser cutting head of the tool.

52. The tool of claim 46 wherein the power source is an internal power source incorporated into the tool.

* * * * *